(12) United States Patent
Okamura et al.

(10) Patent No.: US 9,410,252 B2
(45) Date of Patent: Aug. 9, 2016

(54) CORROSION INHIBITOR INJECTING METHOD

(75) Inventors: Masato Okamura, Yokohama (JP); Tetsuo Oosato, Tokyo (JP); Kazuo Murakami, Kawasaki (JP); Seiji Yamamoto, Tokyo (JP); Hiroyuki Arai, Kamakura (JP); Hidehiro Urata, Yokohama (JP); Hajime Hirasawa, Yokohama (JP); Osamu Shibasaki, Yokohama (JP); Koji Negishi, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 179 days.

(21) Appl. No.: 14/345,148

(22) PCT Filed: Sep. 13, 2012

(86) PCT No.: PCT/JP2012/073503
§ 371 (c)(1),
(2), (4) Date: Mar. 18, 2014

(87) PCT Pub. No.: WO2013/039163
PCT Pub. Date: Mar. 21, 2013

(65) Prior Publication Data
US 2014/0242299 A1    Aug. 28, 2014

(30) Foreign Application Priority Data
Sep. 15, 2011   (JP) .................................. 2011-202239

(51) Int. Cl.
*C23F 11/18* (2006.01)
*C23F 11/08* (2006.01)
(Continued)

(52) U.S. Cl.
CPC ................. *C23F 11/08* (2013.01); *C23F 11/18* (2013.01); *C23F 11/185* (2013.01); *C23F 15/00* (2013.01); *G21C 17/0225* (2013.01); *G21D 3/08* (2013.01); *Y02E 30/40* (2013.01)

(58) Field of Classification Search
CPC .......... C23F 11/00; C23F 11/08; C23F 11/18; C23F 11/185
See application file for complete search history.

(56) References Cited

U.S. PATENT DOCUMENTS 6,940,939 B1 * 9/2005 Ichikawa ............. G21C 17/022
                                              376/301
2003/0180180 A1  9/2003 Okamura et al.
(Continued)

FOREIGN PATENT DOCUMENTS

AU        2010211602 A1   8/2011
JP        2001-276628     10/2001
(Continued)

OTHER PUBLICATIONS

Extended Search Report issued Apr. 1, 2015 in European Patent Application No. 12831961.3.
International Search Report Issued Nov. 6, 2012 in PCT/JP12/073503 Filed Sep. 13, 2012.

*Primary Examiner* — Elizabeth Burkhart
(74) *Attorney, Agent, or Firm* — Oblon, McClelland, Maier & Neustadt, L.L.P.

(57) ABSTRACT

A method for injecting a corrosion inhibitor injecting an oxidant and an anticorrosive agent-pH adjusting agent complex including an anticorrosive agent and a pH adjusting agent adsorbed on a surface of the anticorrosive agent into high temperature water in contact with a surface of a metal structural material and irradiating the high temperature water with a radioactive ray or an ultraviolet ray, wherein the anticorrosive agent of the anticorrosive agent-pH adjusting agent complex has, on the surface of the anticorrosive agent, an active site where the pH adjusting agent reacts with the oxidant, and the pH adjusting agent present on the surface of the anticorrosive agent of the anticorrosive agent-pH adjusting agent complex and/or in the high temperature water is oxidized with the oxidant by the irradiation with the radioactive ray or the ultraviolet ray to change pH adjusting ability of the pH adjusting agent and shift a pH of the high temperature water to a neutral side, and thereby deposition of the anticorrosive agent 11 to the metal structural material 65 is accelerated.

18 Claims, 10 Drawing Sheets

(51) Int. Cl.
  *G21C 17/022* (2006.01)
  *G21D 3/08* (2006.01)
  *C23F 15/00* (2006.01)

(56) References Cited

U.S. PATENT DOCUMENTS

2010/0168497 A1* 7/2010 Enda ................ G21F 9/002 588/1

2012/0039429 A1* 2/2012 Shibasaki ............... C23F 11/18 376/306

FOREIGN PATENT DOCUMENTS

| JP | 2002-131473 | 5/2002 |
| JP | 2003 232886 | 8/2003 |
| JP | 2008 7851 | 1/2008 |
| JP | 2009-216289 | 9/2009 |
| JP | 2011 163828 | 8/2011 |
| WO | WO 2010/090307 A1 | 8/2010 |

* cited by examiner

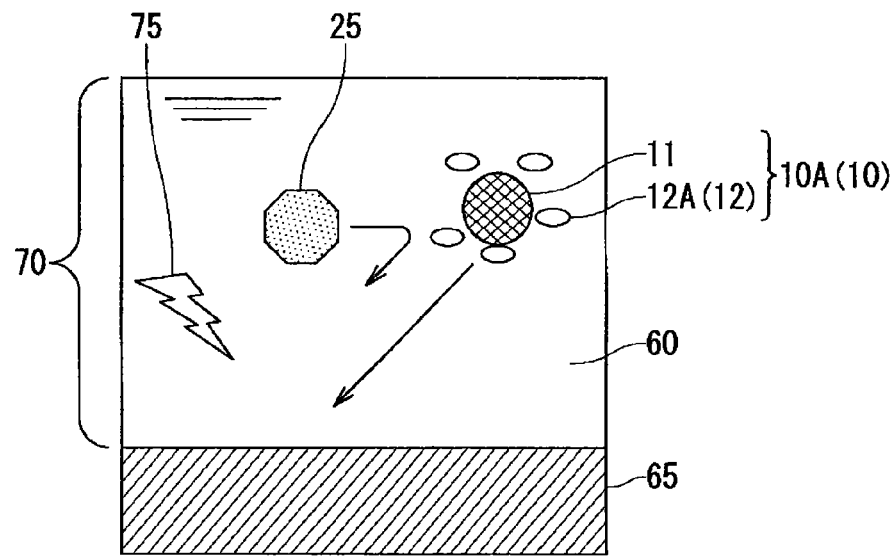
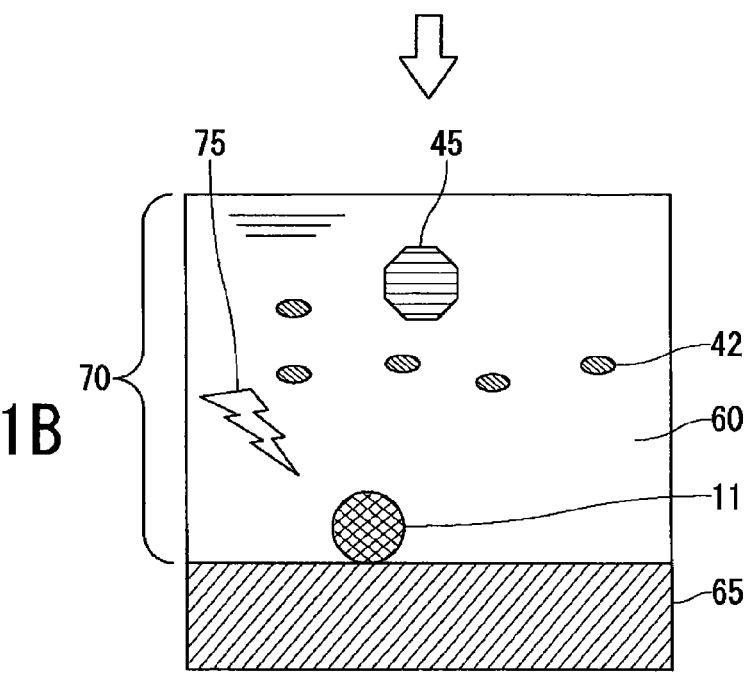
FIG. 1A
FIG. 1B

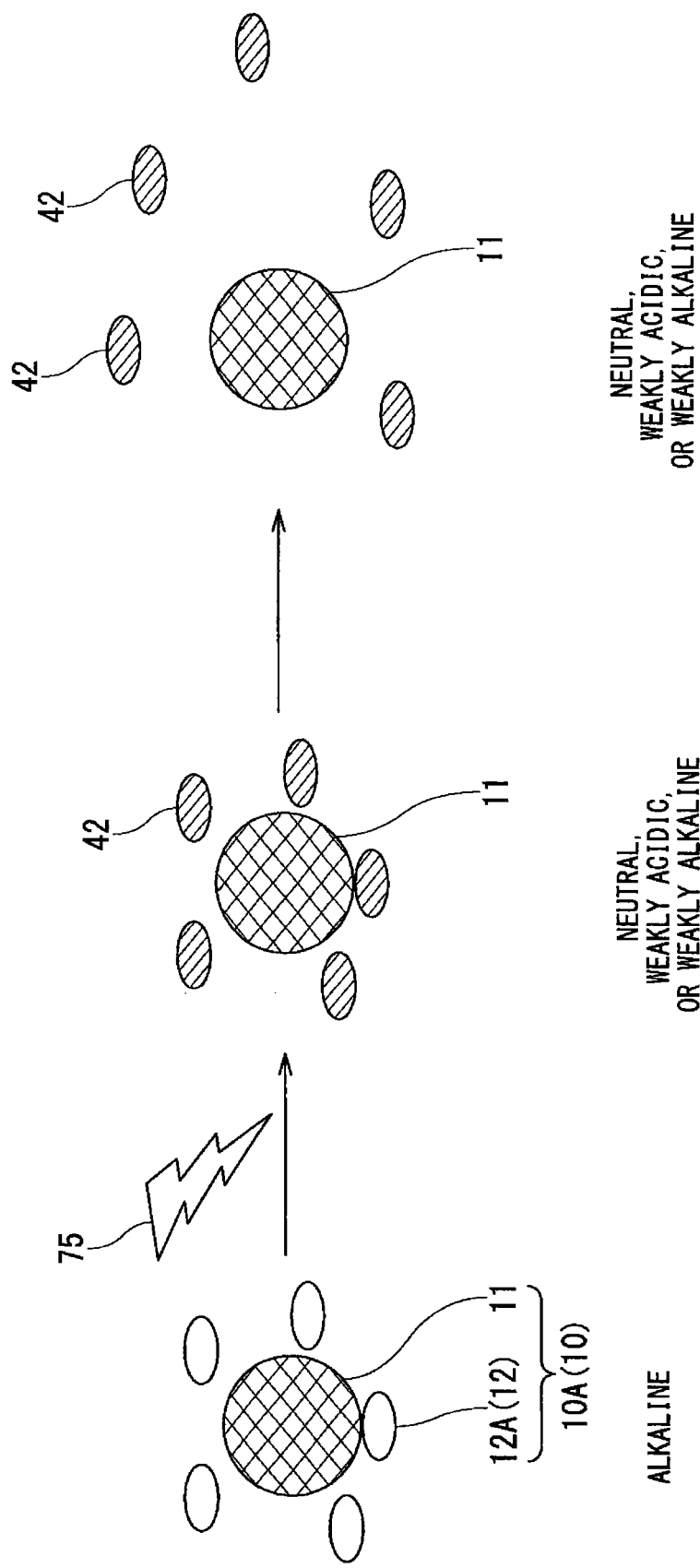

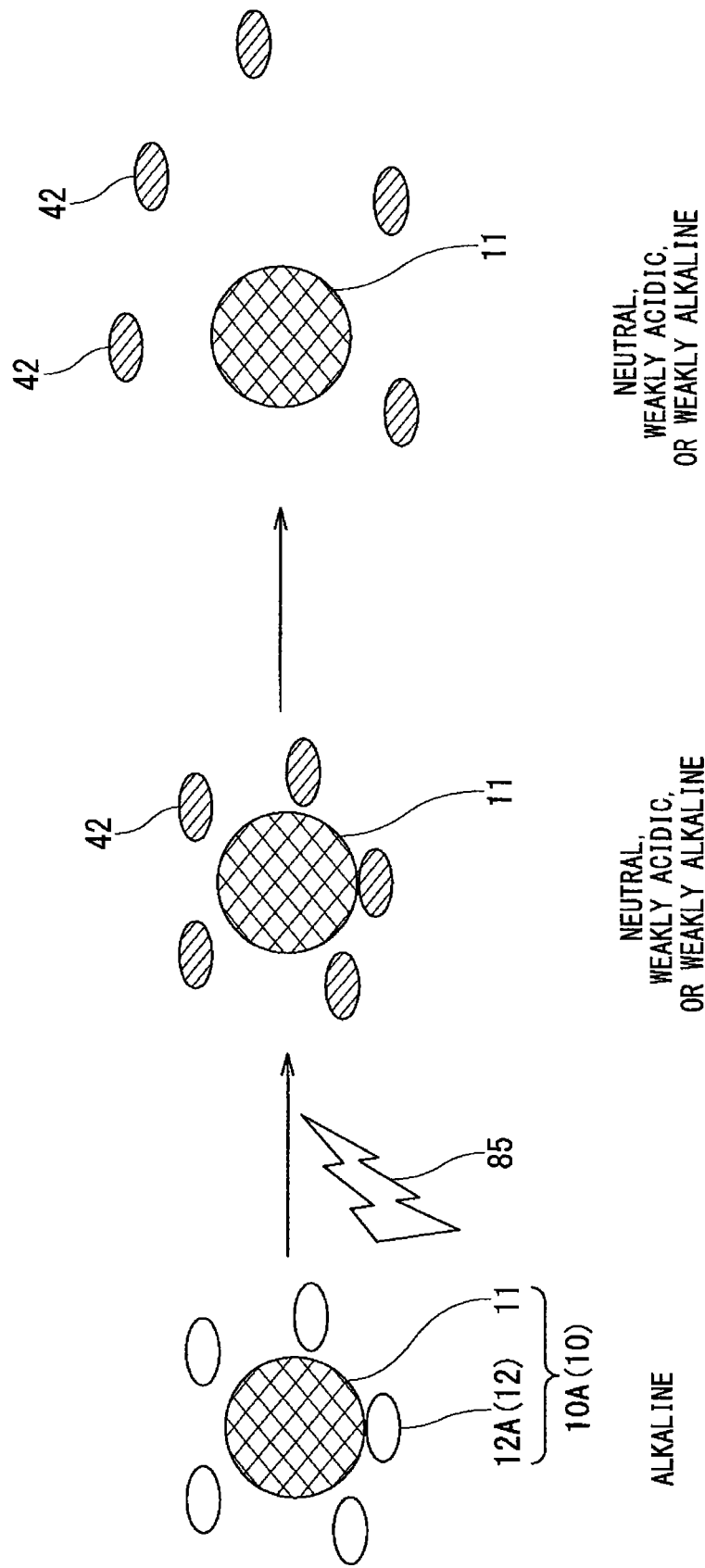

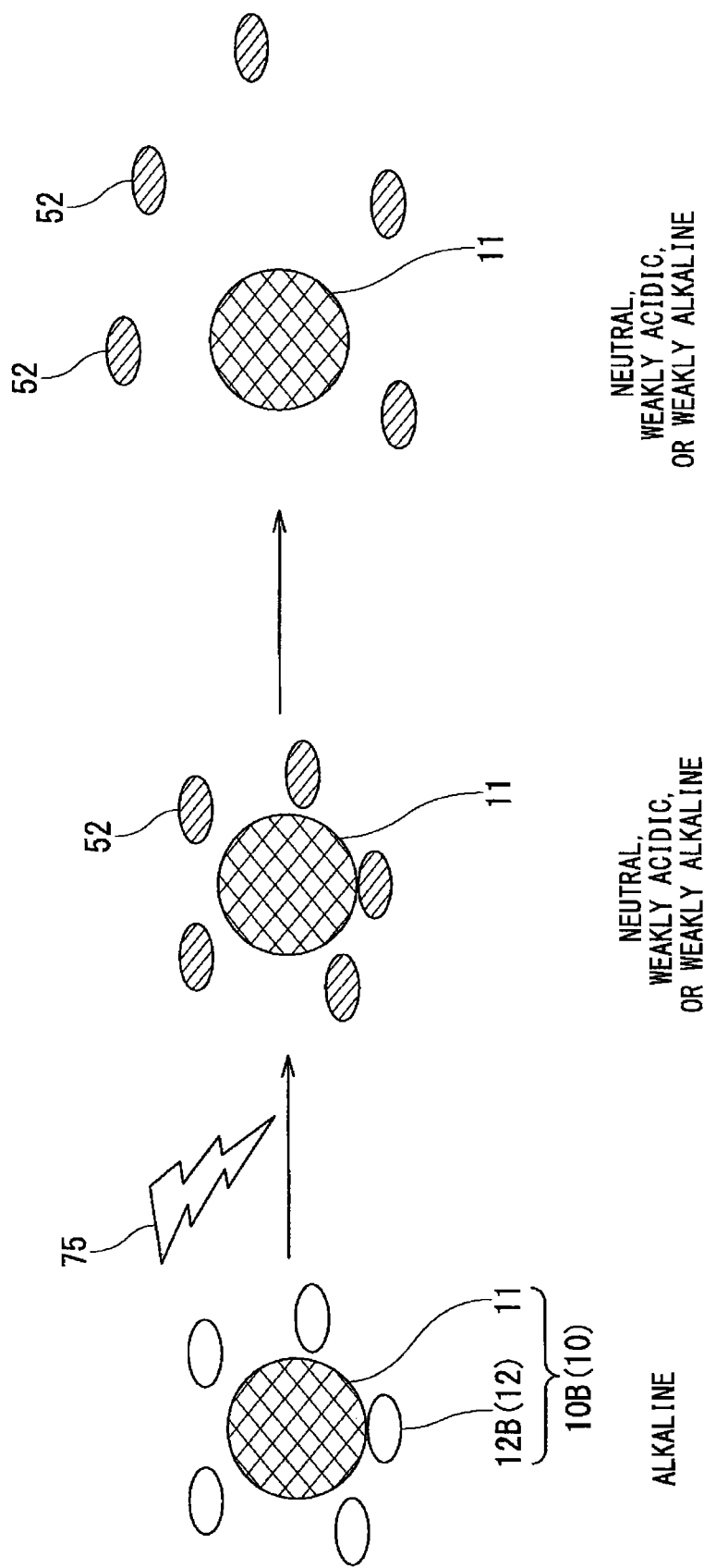

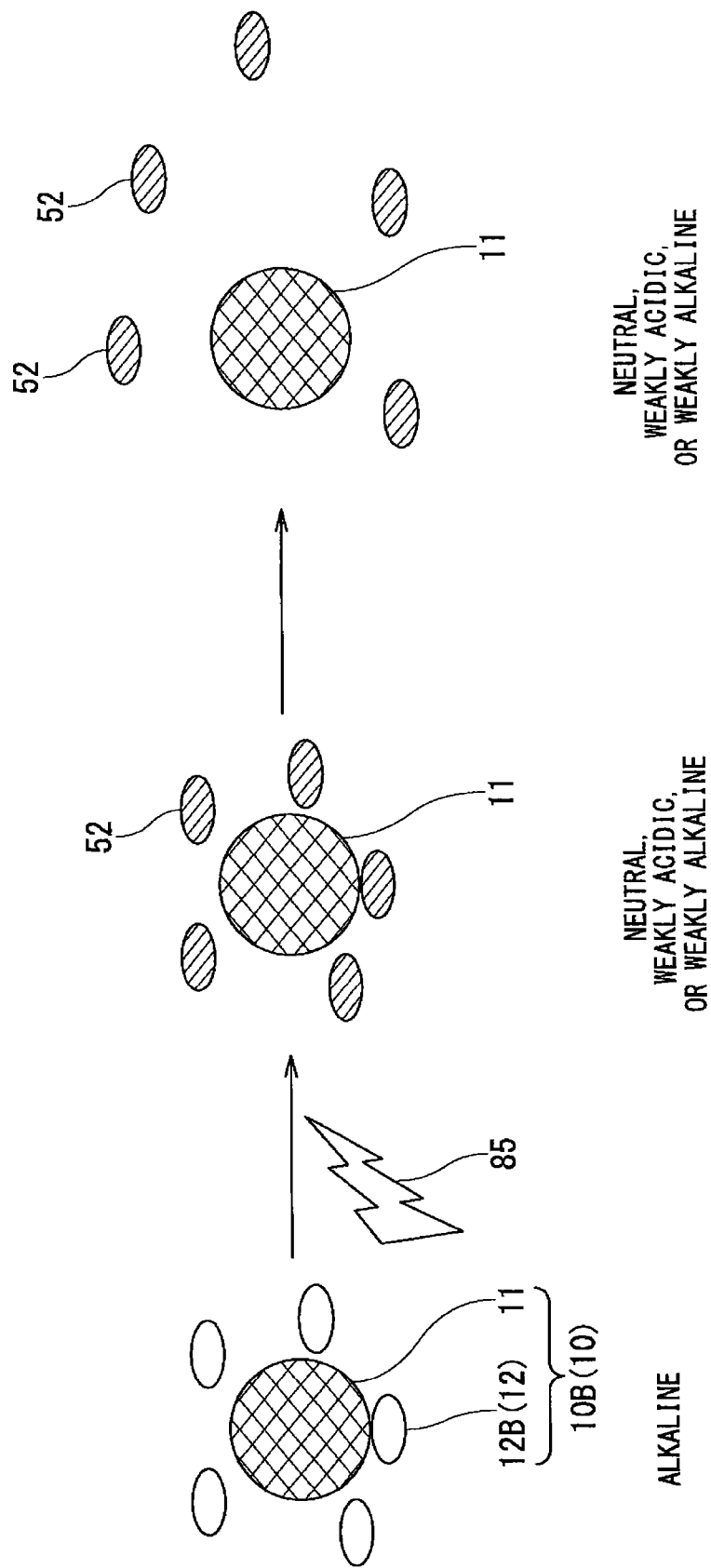

CORROSION INHIBITOR INJECTING METHOD

TECHNICAL FIELD

The present invention relates to a corrosion inhibitor injecting method inhibiting corrosion of a metal material in contact with high temperature water.

BACKGROUND ART

It is known that, in a radiation field such as a boiling water type nuclear power plant, high temperature water in contact with a reactor structural material generates oxygen, hydrogen peroxide, or the like by radiolysis and the oxygen, the hydrogen peroxide, or the like causes a stress corrosion cracking to the reactor structural material.

Hydrogen injection technology of reducing oxygen or hydrogen peroxide in the reactor water by injecting hydrogen from a feed-water system has been developed for the countermeasure.

There exists, for example, noble metal injection technology in which hydrogen injection is carried out after a noble metal such as Pt or Rh is adhered to a surface of the reactor structural material to accelerate the reaction of the noble metal with hydrogen and increase an anode current and thereby corrosion potential is reduced as described in the following Patent Document 1.

A method for utilizing reaction of a photocatalyst using the photocatalyst as an anticorrosive agent has been attracting attention as a method for reducing the corrosion potential in recent years. The method is for reducing the corrosion potential by the action of electrons activated by photostimulated reaction caused by irradiating the photocatalyst arranged on a surface of a metal member with light having a wavelength of near-ultraviolet rays.

The photostimulated reaction efficiently proceeds by a noble metal being present near the photocatalyst. Therefore, it is disclosed in, for example, Patent Document 2 and Patent Document 3 that the corrosion potential while a reactor is in operation is reduced by allowing a high functional photocatalyst to which a photocatalyst or a noble metal is adhered to be adhered to the surface of the structural material in advance and causing the photostimulated reaction utilizing Cherenkov light to be generated in a reactor core.

Moreover, as a construction method for injecting a chemical into the reactor, a method for allowing a chemical to be adhered to the surface of the reactor structural material by injecting the chemical into the reactor during a shutdown period of the reactor or while the reactor is in operation and spreading the chemical on the surface of the reactor structural material is proposed in Patent Document 4 and Patent Document 5.

The method described in the above-described Patent Documents 4 and 5 is a method for injecting a solution, a dispersed particles, or the like into a reactor system and injecting only a chemical into high temperature water, in particular, into high temperature water in a reactor.

PRIOR ART DOCUMENTS

Patent Document

Patent Document 1: Japanese Patent No. 2624906
Patent Document 2: Japanese Patent No. 4094275
Patent Document 3: Japanese Patent No. 4043647
Patent Document 4: Japanese Patent Laid-Open No. 2005-003536
Patent Document 5: Japanese Patent Laid-Open No. 2006

SUMMARY OF THE INVENTION

Problems to be Solved by the Invention

There is a problem that the current construction methods for injecting an anticorrosive agent described in the patent documents require time in construction and make periodic inspection lengthy. And there is also a problem that an operation rate of power generation is lowered when the injecting construction of an anticorrosive agent requires time as described above.

The present invention solves the problems and intends to provide a method for injecting a corrosion inhibitor carrying out the injecting construction of an anticorrosive agent in a short time by increasing a deposition rate of the anticorrosive agent to a surface of a structural material of a reactor.

Means for Solving the Problems

The present invention has been made by finding out that an anticorrosive agent quickly adheres to a surface of a metal structural material by injecting an anticorrosive agent-pH adjusting agent complex comprising an anticorrosive agent and a pH adjusting agent adsorbed on a surface of the anticorrosive agent into high temperature water in contact with a surface of a metal structural material and further adding an oxidant or a reductant as necessary under irradiation with a radioactive ray or an ultraviolet ray.

Namely, the method for injecting a corrosion inhibitor of the present invention is a method for solving the problems and a method for injecting a corrosion inhibitor injecting an oxidant and an anticorrosive agent-pH adjusting agent complex comprising an anticorrosive agent and a pH adjusting agent adsorbed on a surface of the anticorrosive agent into high temperature water in contact with a surface of a metal structural material and irradiating the high temperature water with a radioactive ray or an ultraviolet ray, wherein the anticorrosive agent of the anticorrosive agent-pH adjusting agent complex has, on the surface of the anticorrosive agent, an active site where the pH adjusting agent reacts with the oxidant, and the pH adjusting agent present on the surface of the anticorrosive agent of the anticorrosive agent-pH adjusting agent complex and/or in the high temperature water is oxidized with the oxidant by the irradiation with the radioactive ray or the ultraviolet ray to change pH adjusting ability of the pH adjusting agent and shift a pH of the high temperature water to a neutral side, and thereby deposition of the anticorrosive agent to the metal structural material is accelerated.

Moreover, the method for injecting a corrosion inhibitor of the present invention is for solving the problems and a method for injecting a corrosion inhibitor injecting an anticorrosive agent-pH adjusting agent complex comprising an anticorrosive agent and a pH adjusting agent adhered to a surface of the anticorrosive agent into high temperature water in contact with a surface of a metal structural material and irradiating the high temperature water with a radioactive ray or an ultraviolet ray, wherein the anticorrosive agent generates an oxidant from the high temperature water by the irradiation with the radioactive ray or the ultraviolet ray, and the pH adjusting agent present on the surface of the anticorrosive agent of the anticorrosive agent-pH adjusting agent complex and/or in the high temperature water is oxidized with the oxidant to change pH adjusting ability of the pH adjusting agent and shift a pH of the high temperature water to a neutral side, and thereby deposition of the anticorrosive agent to the metal structural material is accelerated.

Further, the method for injecting a corrosion inhibitor of the present invention is for solving the problems and a method for injecting a corrosion inhibitor injecting a reductant and an anticorrosive agent-pH adjusting agent complex comprising an anticorrosive agent and a pH adjusting agent adhered to a surface of the anticorrosive agent into high temperature water in contact with a surface of a metal structural material and irradiating the high temperature water with a radioactive ray or an ultraviolet ray, wherein the anticorrosive agent of the anticorrosive agent-pH adjusting agent complex has, on the surface of the anticorrosive agent, an active site where the pH adjusting agent reacts with the reductant, and the pH adjusting agent present on the surface of the anticorrosive agent of the anticorrosive agent-pH adjusting agent complex and/or in the high temperature water is reduced with the reductant by the irradiation with the radioactive ray or the ultraviolet ray to change pH adjusting ability of the pH adjusting agent and shift a pH of the high temperature water to a neutral side, and thereby deposition of the anticorrosive agent to the metal structural material is accelerated.

Furthermore, the method for injecting a corrosion inhibitor of the present invention is for solving the problems and a method for injecting a corrosion inhibitor injecting an anticorrosive agent-pH adjusting agent complex comprising an anticorrosive agent and a pH adjusting agent adhered to a surface of the anticorrosive agent into high temperature water in contact with a surface of a metal structural material and irradiating the high temperature water with a radioactive ray or an ultraviolet ray, wherein the anticorrosive agent generates a reductant from the high temperature water by the irradiation with the radioactive ray or the ultraviolet ray, and the pH adjusting agent present on the surface of the anticorrosive agent of the anticorrosive agent-pH adjusting agent complex and/or in the high temperature water is reduced with the reductant to change pH adjusting ability of the pH adjusting agent and shift a pH of the high temperature water to a neutral side, and thereby deposition of the anticorrosive agent to the metal structural material is accelerated.

Advantage of the Invention

According to the method for injecting a corrosion inhibitor of the present invention, a deposition rate of an anticorrosive agent to a metal structural material can be increased.

BRIEF DESCRIPTION OF THE DRAWINGS

FIGS. 1A and 1B are schematic diagrams each describing deposition process of an anticorrosive agent in the case where irradiation with a radioactive ray is carried out in a first and a second embodiment of a method for injecting a corrosion inhibitor of the present invention.

FIGS. 2A to 2C are schematic diagrams each describing a change of an anticorrosive agent-pH adjusting agent complex in the case where irradiation with a radioactive ray is carried out in a first and a second embodiment of a method for injecting a corrosion inhibitor of the present invention.

FIGS. 4A to 4C are schematic diagrams each describing a change of an anticorrosive agent-pH adjusting agent complex in the case where irradiation with an ultraviolet ray is carried out in a first and a second embodiment of a method for injecting a corrosion inhibitor of the present invention.

FIGS. 6A to 6C are schematic diagrams each describing a change of an anticorrosive agent-pH adjusting agent complex in the case where irradiation with a radioactive ray is carried out in a third and a fourth embodiment of a method for injecting a corrosion inhibitor of the present invention.

FIGS. 8A to 8C are schematic diagrams each describing a change of an anticorrosive agent-pH adjusting agent complex in the case where irradiation with an ultraviolet ray is carried out in a third and a fourth embodiment of a method for injecting a corrosion inhibitor of the present invention.

DESCRIPTION OF EMBODIMENTS

Figure 3A:
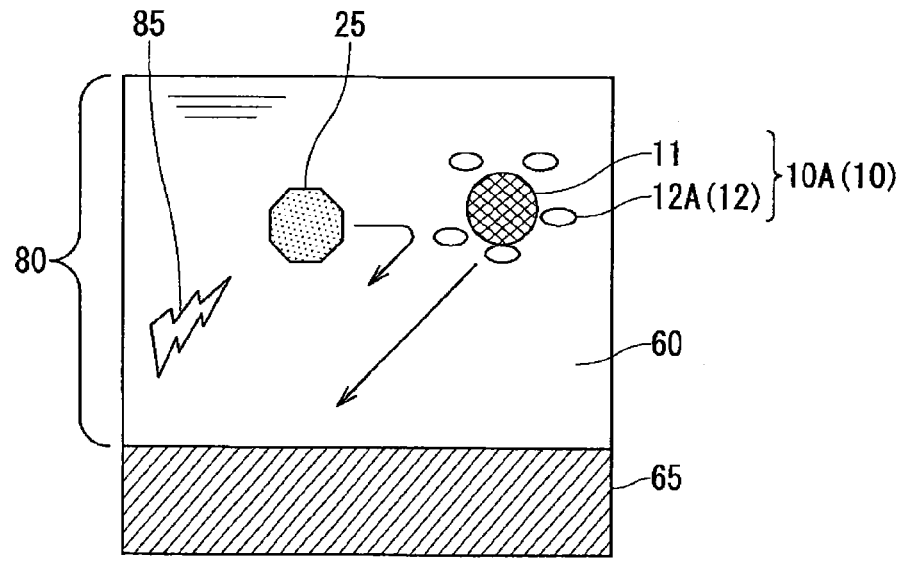
FIGS. 3A and 3B are schematic diagrams each describing deposition process of an anticorrosive agent in the case where irradiation with an ultraviolet ray is carried out in a first and a second embodiment of a method for injecting a corrosion inhibitor of the present invention.

Embodiments of a method for injecting a corrosion inhibitor according to the present invention will be described with reference to attached drawings.

First Embodiment

The first embodiment of the method for injecting a corrosion inhibitor of the present invention is a method for injecting a corrosion inhibitor injecting an oxidant and an anticorrosive agent-pH adjusting agent complex comprising an anticorrosive agent and a pH adjusting agent adsorbed on a surface of the anticorrosive agent into high temperature water in contact with a surface of a metal structural material and irradiating the high temperature water with a radioactive ray or an ultraviolet ray.

As the metal structural material, stainless steel (SUS), a Ni based alloy, or carbon steel for example is used. The SUS, the Ni based alloy, or the carbon steel is used as a reactor structural material in a nuclear power plant such as a boiling water type nuclear power plant. When the corrosion of the SUS, the Ni based alloy, or the carbon steel can be suppressed, the safety of a nuclear power plant is increased.

As the high temperature water, pure water or an aqueous solution in which an impurity ion or the like is contained in the pure water for example is used. The temperature of the high temperature water is usually 100 to 350° C., preferably 120 to 180° C. If the temperature of the high temperature water is 100 to 350° C., the pH adjusting agent adhered to the surface of the anticorrosive agent in the anticorrosive agent-pH adjusting agent complex is desorbed from the surface of the anticorrosive agent and changes the surface energy of the anticorrosive agent and the anticorrosive agent is easily adhered to the metal structural material. Moreover, if the temperature of the high temperature water is 100 to 350° C., the pH adjusting agent adhered to the surface of the anticorrosive agent in the anticorrosive agent-pH adjusting agent complex or present in the high temperature water is easily oxidized with an oxidant.

(Anticorrosive Agent-pH Adjusting Agent Complex)

The anticorrosive agent-pH adjusting agent complex is injected into the high temperature water in the first embodiment of the method for injecting a corrosion inhibitor of the present invention. The anticorrosive agent-pH adjusting agent complex comprises an anticorrosive agent and a pH adjusting agent adsorbed on a surface of the anticorrosive agent.

<Anticorrosive Agent>

The anticorrosive agent is a solid substance adhered to a metal structural material and imparting corrosion prevention effect to the metal structural material. As the anticorrosive agent, a photocatalyst having sufficient corrosion prevention effect to the metal structural material and causing photocatalytic reaction by irradiation with a radioactive ray or an ultraviolet ray is used. Moreover, a semiconductor for example is used as the photocatalyst.

Among semiconductors, an n-type semiconductor is preferable because the n-type semiconductor causes the photocatalytic reaction by irradiation with a radioactive ray or an ultraviolet ray, generates an oxidant from the high temperature water on the surface of the n-type semiconductor and in the high temperature water near the surface of the n-type semiconductor, and increases the amount of oxidant and thereby the deposition rate of the anticorrosive agent to the metal structural material is increased.

Moreover, in the case where a metal structural material is used as a reactor structural material, it is easy to control the corrosion of the reactor structural material with the n-type semiconductor. Namely, when a corrosion oxide film is formed on the surface of the reactor structural material, it sometimes occurs that the corrosion oxide film becomes a p-type semiconductor. And, when Cherenkov light is irradiated on the corrosion oxide film of the p-type semiconductor in a pressure vessel, there is a possibility that the corrosion potential increases and the corrosion of the reactor structural material proceeds. On the other hand, when the anticorrosive agent adhered to the surface of the reactor structural material is an n-type semiconductor causing photocatalytic reaction, the n-type semiconductor reduces the corrosion potential of the corrosion oxide film of the p-type semiconductor and the corrosion of the reactor structural material can be suppressed.

As the n-type semiconductor, titanium oxide $TiO_2$ for example is used. Among n-type semiconductors, the titanium oxide is preferable because the titanium oxide has high photocatalytic performance and is stable.

The form of the anticorrosive agent is not particularly limited but is usually powder form. In the case where the anticorrosive agent is powder form, the average particle diameter of the anticorrosive agent is usually 1 μm or less, preferably 0.02 μm to 1 μm, more preferably 0.02 μm to 0.3 μm.

When the average particle diameter of the anticorrosive agent is 1 μm or less, the anticorrosive agent is easily adhered to the surface of the metal structural material, the surface area of the anticorrosive agent becomes large, and thereby the effect of reducing the corrosive potential of the metal structural material becomes large.

The anticorrosive agent has, on the surface thereof, an active site where the pH adjusting agent adsorbed on the anticorrosive agent reacts with the oxidant. Here the active site means a surface on which the anticorrosive agent is exposed and a part where the reaction of the pH adjusting agent with the oxidant is caused. Therefore, even if a part is surface on which the anticorrosive agent is exposed, the part where the reaction of the pH adjusting agent with the oxidant is not caused is not the active site. The active site on the surface of the anticorrosive agent is formed by chemical polishing, physical polishing, or the like of the surface of the anticorrosive agent.

<pH Adjusting Agent>

The pH adjusting agent is for adjusting the pH of the high temperature water. In the first embodiment of the method for injecting a corrosion inhibitor of the present invention, an alkaline type pH adjusting agent making the pH of the high temperature water high by the addition to the high temperature water is used as the pH adjusting agent.

As the alkaline type pH adjusting agent, an inorganic compound or an organic compound containing one or more elements selected from nitrogen, sulfur, and carbon for example is used. Examples of the inorganic compound include potassium carbonate, sodium bicarbonate, sodium carbonate, potassium hydroxide, sodium hydroxide, and calcium hydroxide, or salts thereof. Examples of the organic compound include trisodium citrate, ethanolamine, triethanolamine, and hydrazine, or salts thereof.

In addition, in the case where the pH adjusting agent is liquid, the anticorrosive agent-pH adjusting agent complex takes the form in which the pH adjusting agent wets the surface of the anticorrosive agent, and when the anticorrosive agent-pH adjusting agent complex is injected into the high temperature water, the pH adjusting agent is easily desorbed from the surface of the anticorrosive agent. In the present invention, it is desirable that the pH adjusting agent of the anticorrosive agent-pH adjusting agent complex continues to be adsorbed on the surface of the anticorrosive agent until the pH adjusting agent is oxidized by the oxidant even though the anticorrosive agent-pH adjusting agent complex is injected into the high temperature water. Therefore, it is preferable that the pH adjusting agent adsorbed on the surface of the anticorrosive agent is in the form of a solid, such as fine particles, that is easily adsorbed on the surface of the anticorrosive agent, or in paste form.

When the anticorrosive agent-pH adjusting agent complex of which pH adjusting agent is an alkaline type pH adjusting agent is injected into the high temperature water, the pH of the high temperature water after the anticorrosive agent-pH adjusting agent complex is added becomes alkaline before irradiation with a radioactive ray or an ultraviolet ray.

In the case where the pH adjusting agent is an alkaline type pH adjusting agent, the value of the pH of the high temperature water into which the anticorrosive agent-pH adjusting agent complex is injected is more than 9 for example.

When the pH adjusting agent is solid or in paste form, the anticorrosive agent-pH adjusting agent complex is obtained by, for example, mixing the anticorrosive agent and the pH adjusting agent and allowing the pH adjusting agent to be adsorbed on the surface of the anticorrosive agent. Here, the meaning that the pH adjusting agent is in paste form includes both of an aspect in which the pH adjusting agent itself is in paste form and an aspect in which the pH adjusting agent itself is solid and the pH adjusting agent is mixed in paste.

When the pH adjusting agent is liquid, the anticorrosive agent-pH adjusting agent complex is obtained by, for example, putting the anticorrosive agent into the pH adjusting agent and allowing the pH adjusting agent to be adsorbed on the anticorrosive agent.

(Oxidant)

The oxidant is an oxidant oxidizing the pH adjusting agent. As the oxidant, one or more selected from hydrogen peroxide, oxygen, ozone, a superoxide radical ($.O^{2-}$), and a hydroxy radical ($.OH$) are used.

Among these oxidants, the superoxide radical $.O^{2-}$ and the hydroxyl radical $.OH$ are usually generated from water such as high temperature water by irradiating water such as high temperature water with a radioactive ray or an ultraviolet ray and disappear in a short time.

Therefore, when it is necessary to make the oxidant exist at the time of injecting the oxidant into the high temperature water in the first embodiment of the method for injecting a corrosion inhibitor of the present invention, one or more selected from hydrogen peroxide, oxygen, and ozone are preferable.

However, in a radiation field or an ultraviolet ray irradiation environment, namely when the environment in which the high temperature water is irradiated with a radioactive ray or an ultraviolet ray is formed, the oxidant is generated from water such as high temperature water at the time when the high temperature water is irradiated with the radioactive ray or the ultraviolet ray. Moreover, when the oxidant such as an aqueous solution of an oxidant in a form that contains water is injected into the high temperature water, the oxidant is generated from the injected water at the time when the water injected into the radiation field or the ultraviolet ray irradiation environment is irradiated with the radioactive ray or the ultraviolet ray.

Therefore, it can be said that when the high temperature water in a radiation field or an ultraviolet ray irradiation environment is irradiated with a radioactive ray or an ultraviolet ray, the superoxide radical $.O^{2-}$ and the hydroxyl radical $.OH$ generated from the high temperature water are substantially injected at the time when the oxidant is injected into the high temperature water.

In the first embodiment of the method for injecting a corrosion inhibitor of the present invention, the anticorrosive agent-pH adjusting agent complex and the oxidant are injected into the high temperature water in contact with the surface of the metal structural material. The order of the injection of the anticorrosive agent-pH adjusting agent complex and the oxidant into the high temperature water is not particularly limited. For example, the anticorrosive agent-pH adjusting agent complex and the oxidant may be simultaneously injected into the high temperature water, or after any one of the anticorrosive agent-pH adjusting agent complex and the oxidant is injected, the other may by injected.

(Radioactive Ray or Ultraviolet Ray)

In the first embodiment of the present invention, the radioactive ray or the ultraviolet ray facilitates the reaction oxidizing the pH adjusting agent present on the surface of the anticorrosive agent of the anticorrosive agent-pH adjusting agent complex and/or in the high temperature water with the oxidant and newly generates an oxidant from the high temperature water.

Here, the pH adjusting agent present in the high temperature water means a pH adjusting agent that is desorbed from the surface of the anticorrosive agent of the anticorrosive agent-pH adjusting agent complex and is present in the high temperature water.

Moreover, the meaning of the oxidant oxidizing the pH adjusting agent includes an oxidant injected into the high temperature water together with the anticorrosive agent-pH adjusting agent complex and an oxidant to be newly generated from the high temperature water.

Here, the oxidant newly generated from the high temperature water is an oxidant such as a superoxide radical $.O^{2-}$ and the hydroxyl radical $.OH$ generated by the photocatalytic reaction caused by the anticorrosive agent present in the anticorrosive agent-pH adjusting agent complex or the anticorrosive agent adsorbed on the metal structural material being irradiated with a radioactive ray or an ultraviolet ray.

In addition, the oxidant injected into the high temperature water together with the anticorrosive agent-pH adjusting agent complex means, as described above, one or more selected from hydrogen peroxide, oxygen, ozone, a superoxide radical ($.O^{2-}$), and a hydroxy radical ($.OH$).

As the radioactive ray, an α-ray, a γ-ray, or a neutron ray for example is used. The α-ray, the γ-ray, or the neutron ray is preferable because the α-ray, the γ-ray, or the neutron ray sufficiently facilitates the oxidation reaction of the pH adjusting agent by the oxidant and newly generates an oxidant from the high temperature water at high efficiency.

As the ultraviolet ray, for example, a near-ultraviolet ray of a wavelength of 200 to 380 nm, a far-ultraviolet ray of a wavelength of 100 to 200 nm, or the like is used. The peak wavelength of the near-ultraviolet ray is usually within the range of 200 to 300 nm, preferably within the range of 230 to 270 nm.

In the first embodiment of the present invention, as described above, the pH adjusting ability of the pH adjusting agent is changed by chemically changing the pH adjusting agent by oxidizing the pH adjusting agent present on the surface of the anticorrosive agent of the anticorrosive agent-pH adjusting agent complex and/or in the high temperature water with the oxidant by irradiation with a radioactive ray or an ultraviolet ray. Here, the meaning of the change of the pH adjusting ability includes both losing the pH adjusting ability and the pH adjusting ability becoming weak.

In the first embodiment of the present invention, an alkaline type pH adjusting agent making the pH of the high temperature water high by adding the pH adjusting agent to the high temperature water is used as the pH adjusting agent. Therefore, the pH of the high temperature water after the anticorrosive agent-pH adjusting agent complex is added is adjusted by the alkaline type pH adjusting agent adhered to the surface of the anticorrosive agent in the anticorrosive agent-pH adjusting agent complex or desorbed from the surface of the anticorrosive agent and present in the high temperature water and becomes alkaline before irradiation with a radioactive ray or an ultraviolet ray.

When the alkaline type pH adjusting agent is oxidized with the oxidant and the pH adjusting ability is changed, it becomes difficult to keep the pH of the high temperature water alkaline, and therefore the pH of the high temperature water is shifted from an alkaline side to a neutral side.

When the pH of the high temperature water is shifted from the alkaline side to the neutral side, the surface potential of the anticorrosive agent is reduced and therefore the corrosion prevention effect of the anticorrosive agent is enhanced. Moreover, when the pH of the high temperature water is shifted from the alkaline side to the neutral side, an aggregation rate of the anticorrosive agent is increased compared with the case where the pH of the high temperature water 60 is alkaline, and therefore the deposition rate of the anticorrosive agent to the metal structural material and the deposition rate between the anticorrosive agents are increased.

Therefore, according to the first embodiment of the method for injecting a corrosion inhibitor of the present invention, the deposition rate of the anticorrosive agent to the metal structural material is accelerated compared with the case of the conventional method for injecting a corrosion inhibitor.

It is preferable that the pH of the high temperature water after the pH of the high temperature water is shifted to the neutral side is neutral, weakly acidic, or weakly alkaline because the deposition rate of the anticorrosive agent to the metal structural material is accelerated. Specifically, it is desirable that the pH of the high temperature water after the pH of the high temperature water is shifted to the neutral side is usually within the range of 4 to 10, preferably 5 to 9, more preferably 6 to 8.

(Operation)

The operation of the first embodiment of the method for injecting a corrosion inhibitor of the present invention will be described with reference to drawings.

In the first embodiment of the method for injecting a corrosion inhibitor of the present invention, a method for irradiation with a radioactive ray and a method for irradiation with an ultraviolet ray are present. In the first place, the operation of the method for irradiation with a radioactive ray will be described.

<Operation of Method for Irradiation with Radioactive Ray in the First Embodiment>

FIG. 1 is a schematic diagram describing the deposition process of an anticorrosive agent in the case where irradiation with a radioactive ray is carried out in the first embodiment and the second embodiment described later of a method for injecting a corrosion inhibitor of the present invention.

Specifically, FIG. 1A is a schematic diagram schematically illustrating a situation of an anticorrosive agent-pH adjusting agent complex before the anticorrosive agent-pH adjusting agent complex is oxidized with an oxidant in a radiation field. Moreover, FIG. 1B is a schematic diagram schematically illustrating a situation of an anticorrosive agent-pH adjusting agent complex after the anticorrosive agent-pH adjusting agent complex is oxidized with an oxidant in a radiation field.

FIG. 2 is a schematic diagram describing the change of an anticorrosive agent-pH adjusting agent complex in the case where irradiation with a radioactive ray is carried out in the first embodiment and the second embodiment described later of a method for injecting a corrosion inhibitor of the present invention.

Specifically, FIG. 2A is a schematic diagram schematically illustrating a situation in which an anticorrosive agent-pH adjusting agent complex is present in alkaline high temperature water before irradiation with a radioactive ray. Moreover, FIG. 2B is a schematic diagram schematically illustrating a situation in which a pH adjusting agent of an anticorrosive agent-pH adjusting agent complex is oxidized to generate an oxidation product of the pH adjusting agent and a pH of high temperature water is shifted to a neutral side after irradiation with a radioactive ray. Furthermore, FIG. 2C is a schematic diagram schematically illustrating a situation in which the oxidation product of the pH adjusting agent is desorbed from the anticorrosive agent in neutral, weakly acidic, or weakly alkaline high temperature water after irradiation with a radioactive ray.

In addition, as a method for irradiation with a radioactive ray in the first embodiment, a method for irradiation with a radioactive ray after injecting the anticorrosive agent-pH adjusting agent complex and the oxidant and a method for injecting the anticorrosive agent-pH adjusting agent complex and the oxidant in a state in which irradiation with a radioactive ray is being carried out are present. In the first place, the operation of the method for irradiation with a radioactive ray after injecting the anticorrosive agent-pH adjusting agent complex and the oxidant will be described.

[Operation of Method for Irradiation with Radioactive Ray after Injecting Anticorrosive Agent-pH Adjusting Agent Complex and Oxidant]

In the first embodiment, the pH adjusting agent 12 that constitutes the anticorrosive agent-pH adjusting agent complex 10 is an alkaline type pH adjusting agent 12A, and the anticorrosive agent-pH adjusting agent complex 10 is an anticorrosive agent-pH adjusting agent complex 10A comprising an anticorrosive agent 11 and an alkaline type pH adjusting agent 12A.

Initially, the pH of the high temperature water 60 is adjusted by the alkaline type pH adjusting agent 12A to be alkaline in such a state that the anticorrosive agent-pH adjusting agent complex 10A comprising the anticorrosive agent 11 and the alkaline type pH adjusting agent 12A and the oxidant 25 are injected into the high temperature water 60 in a radiation field 70 as illustrated in FIG. 1A and FIG. 2A and that is before irradiation with a radioactive ray 75 illustrated in FIG. 1A is carried out.

In addition, a state in which all of the alkaline type pH adjusting agents 12A are adsorbed on the anticorrosive agent 11 of the anticorrosive agent-pH adjusting agent complex 10A is illustrated in FIG. 1A, however, a part of the alkaline type pH adjusting agents 12A of the anticorrosive agent-pH adjusting agent complex 10A may be desorbed from the anticorrosive agent 11 and present in the high temperature water 60 in the present invention.

Next, when the high temperature water 60 in a radiation field 70 is irradiated with a radioactive ray 75, the oxidant 25 in the high temperature water 60 comes close to the anticorrosive agent-pH adjusting agent complex 10A and oxidizes the alkaline type pH adjusting agent 12A of the anticorrosive agent-pH adjusting agent complex 10A as illustrated in FIG. 1A.

Moreover, the anticorrosive agent 11 of the anticorrosive agent-pH adjusting agent complex 10A causes photocatalytic reaction by the irradiation with the radioactive ray 75. An oxidant 25 such as a superoxide radical $.O^{2-}$ and a hydroxyl radical .OH is generated from the high temperature water 60 on or near the surface of the anticorrosive agent 11 by the photocatalytic reaction. Therefore, the oxidant 25 such as a superoxide radical $.O^{2-}$ generated from inside the high temperature water 60 by the photocatalytic reaction is included in the oxidant 25 in the high temperature water 60 in addition to the oxidant 25 injected into the high temperature water 60.

The alkaline type pH adjusting agent 12A of the anticorrosive agent-pH adjusting agent complex 10A is converted to the oxidation product 42 of the pH adjusting agent when oxidized with the oxidant 25 as illustrated in FIG. 2B. The pH adjusting ability of the oxidation product 42 of the pH adjusting agent by which pH adjusting ability the pH of the high temperature water 60 is made alkaline becomes smaller compared with the pH adjusting ability of the alkaline type pH adjusting agent 12A before the oxidation, and therefore the pH of the high temperature water 60 is shifted from the alkaline side to the neutral side.

When the oxidation of the alkaline type pH adjusting agent 12A by the oxidant 25 sufficiently proceeds; the pH adjusting ability of the alkaline type pH adjusting agent 12A is changed; and the pH of the high temperature water 60 is greatly shifted to the neutral side, the oxidation product 42 of the pH adjusting agent generated from the alkaline type pH adjusting agent 12A is desorbed from the anticorrosive agent 11 as illustrated in FIG. 1B and FIG. 2C. The exposed anticorrosive agent 11 from which the oxidation product 42 of the pH adjusting agent is desorbed adheres to the surface of the metal structural material 65 as illustrated in FIG. 1B.

In addition, when the pH of the high temperature water 60 is greatly shifted to the neutral side to become neutral, weakly acidic, or weakly basic, the aggregation rate of the anticorrosive agent 11 is increased compared with the case where the pH of the high temperature water is alkaline, and therefore the deposition rate of the anticorrosive agent 11 to the metal structural material 65 and deposition rate between the anticorrosive agents 11 are increased in the first embodiment of the method for injecting a corrosion inhibitor of the present invention compared with the case of the conventional method.

Here, to be neutral, weakly acidic, or weakly alkaline specifically means that the pH of the high temperature water 60 is usually within the range of 4 to 10, preferably 5 to 9, more preferably 6 to 8.

Moreover, when the pH of the high temperature water 60 is greatly shifted to the neutral side to become neutral, weakly acidic, or weakly alkaline, the surface potential of the anticorrosive agent 11 is reduced, and therefore the first embodiment of the method for injecting a corrosion inhibitor of the present invention enhances the corrosion prevention effect of the anticorrosive agent 11 to the metal structural material 65 compared with the conventional method.

The oxidant 25 itself is reduced when the oxidant oxidizes the alkaline type pH adjusting agent 12A of the anticorrosive agent-pH adjusting agent complex 10A to become a reduction product 45 of the oxidant as illustrated in FIG. 1B.

[Operation of Method for Injecting Anticorrosive Agent-pH Adjusting Agent Complex and Oxidant in State in which Irradiation with Radioactive Ray is being Carried Out]

Next, the operation of the method for injecting the anticorrosive agent-pH adjusting agent complex and the oxidant in a state in which irradiation with a radioactive ray is being carried out will be described.

Among the methods for irradiation with a radioactive ray in the first embodiment of the method for injecting a corrosion inhibitor of the present invention, the operation of the method for injecting the anticorrosive agent-pH adjusting agent complex and the oxidant in a state in which irradiation with a radioactive ray is being carried out is different in that the oxidant in the high temperature water quickly oxidizes the alkaline type pH adjusting agent of the anticorrosive agent-pH adjusting agent complex when compared with the operation of the method for irradiation with a radioactive ray after the anticorrosive agent-pH adjusting agent complex and the oxidant are injected among the methods for irradiation with a radioactive ray in the first embodiment of the method for injecting a corrosion inhibitor of the present invention, and other operation is the same. Therefore, the description will be omitted or simplified with regard to the parts where operation is the same.

The operation will be described with reference to FIG. 1 and FIG. 2.

Initially, when the anticorrosive agent-pH adjusting agent complex 10A comprising the anticorrosive agent 11 and the alkaline type pH adjusting agent 12A and the oxidant 25 are injected into the high temperature water 60 in a radiation field 70, the anticorrosive agent-pH adjusting agent complex 10A and the oxidant 25 are present in the high temperature water 60 as illustrated in FIG. 1A and FIG. 2A. Therefore, the pH of the high temperature water 60 is adjusted by the alkaline type pH adjusting agent 12A to become alkaline in a state in which the alkaline type pH adjusting agent 12A is not sufficiently oxidized by the oxidant 25 immediately after the anticorrosive agent-pH adjusting agent complex 10A and the oxidant 25 are injected into the high temperature water 60.

However, since the high temperature water 60 in a radiation field 70 is irradiated with a radioactive ray 75, the oxidant 25 in the high temperature water 60 quickly comes close to the anticorrosive agent-pH adjusting agent complex 10A and oxidizes the alkaline type pH adjusting agent 12A of the anticorrosive agent-pH adjusting agent complex 10A as illustrated in FIG. 1A.

Moreover, since the high temperature water 60 in the radiation field 70 is irradiated with the radioactive ray 75, the anticorrosive agent 11 of the anticorrosive agent-pH adjusting agent complex 10A quickly causes the photocatalytic reaction. An oxidant 25 such as a superoxide radical $.O^{2-}$ and a hydroxyl radical .OH is also generated from inside the high temperature water 60 by the photocatalytic reaction.

Therefore, the oxidant 25 such as a superoxide radical $.O^{2-}$ generated from inside the high temperature water 60 by the photocatalytic reaction is included in the oxidant 25 in the high temperature water 60 in addition to the oxidant 25 injected into the high temperature water 60.

Since the operation after the photocatalytic reaction is the same as the operation of the method for irradiation with a radioactive ray after the anticorrosive agent-pH adjusting agent complex and the oxidant are injected among the methods for irradiation with a radioactive ray in the first embodiment, the description is omitted.

<Operation of Method for Irradiation with Ultraviolet Ray in the First Embodiment>

The operation of the method for irradiation with an ultraviolet ray will be described.

FIG. 3 is a schematic diagram describing the deposition process of an anticorrosive agent in the case where irradiation with an ultraviolet ray is carried out in the first embodiment and the second embodiment described later of the method for injecting a corrosion inhibitor of the present invention.

Figure 3B:
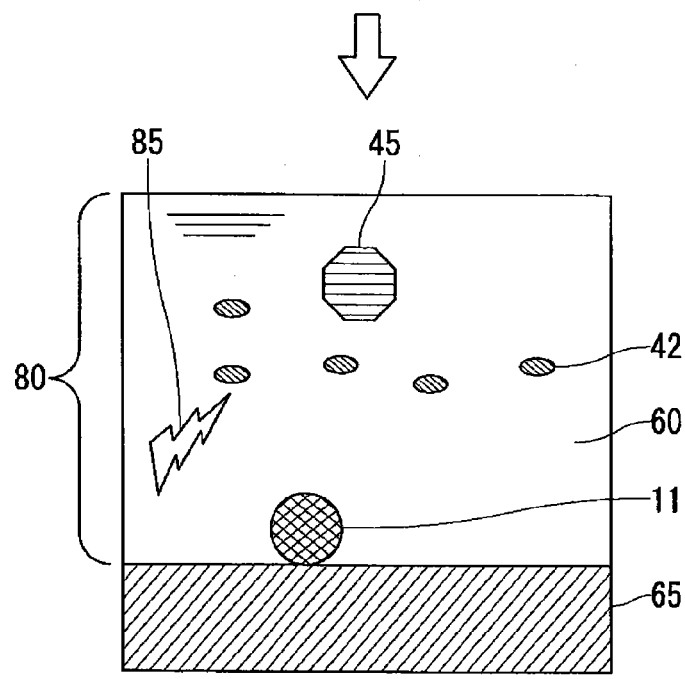

Specifically, FIG. 3A is a schematic diagram schematically illustrating a situation of an anticorrosive agent-pH adjusting agent complex before the anticorrosive agent-pH adjusting agent complex is oxidized by an oxidant in an ultraviolet ray irradiation environment. Moreover, FIG. 3B is a schematic diagram schematically illustrating a situation of an anticorrosive agent-pH adjusting agent complex after the anticorrosive agent-pH adjusting agent complex is oxidized by an oxidant in an ultraviolet ray irradiation environment.

In addition, FIG. 3 is the same as FIG. 1 when compared with FIG. 1 except that the radiation field 70 is changed to the ultraviolet ray irradiation environment 80 and that the radioactive ray 75 is changed to the ultraviolet ray 85, and therefore the same constituents are designated as the same signs, and the description of constituents is omitted.

FIG. 4 is a schematic diagram describing the change of an anticorrosive agent-pH adjusting agent complex in the case where irradiation with an ultraviolet ray is carried out in the first embodiment and the second embodiment described later of the method for injecting a corrosion inhibitor of the present invention.

Specifically, FIG. 4A is a schematic diagram schematically illustrating a situation in which an anticorrosive agent-pH adjusting agent complex is present in alkaline high temperature water before irradiation with an ultraviolet ray. Moreover, FIG. 4B is a schematic diagram schematically illustrating a situation in which a pH adjusting agent of an anticorrosive agent-pH adjusting agent complex is oxidized to generate an oxidation product of the pH adjusting agent and a pH of high temperature water is shifted to a neutral side after irradiation with an ultraviolet ray. Furthermore, FIG. 4C is a schematic diagram schematically illustrating a situation in which the oxidation product of the pH adjusting agent is desorbed from the anticorrosive agent in neutral, weakly acidic, or weakly alkaline high temperature water after irradiation with an ultraviolet ray.

In addition, FIG. 4 is the same as FIG. 2 when compared with FIG. 2 except that the radioactive ray 75 is changed to the ultraviolet ray 85, and therefore the same constituents are designated as the same signs, and the description of constituents is omitted.

As a method for irradiation with an ultraviolet ray in the first embodiment of the method for injecting a corrosion inhibitor of the present invention, a method for irradiation with an ultraviolet ray after injecting the anticorrosive agent-pH adjusting agent complex and the oxidant and a method for injecting the anticorrosive agent-pH adjusting agent complex and the oxidant in a state in which irradiation with an ultraviolet ray is being carried out are present.

The operation of the method for irradiation with an ultraviolet ray in the first embodiment of the present invention is the same as the operation of the method for irradiation with a radioactive ray in the first embodiment of the present invention when compared with the operation of the method for irradiation with a radioactive ray in the first embodiment of the present invention except that the radiation field 70 is changed to the ultraviolet ray irradiation environment 80 and that the radioactive ray 75 is changed to the ultraviolet ray 85.

Namely, the operation of the method for irradiation with an ultraviolet ray in the first embodiment of the present invention can be described by replacing FIG. 1 with FIG. 3, FIG. 2 with FIG. 4, radiation field 70 with ultraviolet ray irradiation environment 80, and radioactive ray 75 with ultraviolet ray 85 in the description part of the operation of the method for irradiation with a radioactive ray in the first embodiment of the present invention.

Specifically, among methods for irradiation with an ultraviolet ray in the first embodiment of the method for injecting a corrosion inhibitor of the present invention, the operation in both cases of the method for irradiation with an ultraviolet ray after injecting the anticorrosive agent-pH adjusting agent complex and the oxidant and the method for injecting the anticorrosive agent-pH adjusting agent complex and the oxidant in a state in which irradiation with an ultraviolet ray is being carried out can be described.

Therefore, the description of the operation of the method for irradiation with an ultraviolet ray in the first embodiment of the method for injecting a corrosion inhibitor of the present invention is omitted.

(Effect of the First Embodiment)

According to the first embodiment of the method for injecting a corrosion inhibitor of the present invention, the deposition rate of the anticorrosive agent 11 to the metal structural material 65 is accelerated compared with the case of the conventional method for injecting a corrosion inhibitor.

Second Embodiment

The second embodiment of the method for injecting a corrosion inhibitor of the present invention is a method for injecting a corrosion inhibitor injecting an anticorrosive agent-pH adjusting agent complex comprising an anticorrosive agent and a pH adjusting agent adhered to a surface of the anticorrosive agent into high temperature water in contact with a surface of a metal structural material and irradiating the high temperature water with a radioactive ray or an ultraviolet ray, wherein the anticorrosive agent generates an oxidant from the high temperature water by the irradiation with the radioactive ray or the ultraviolet ray.

The second embodiment of the method for injecting a corrosion inhibitor of the present invention is different when compared with the first embodiment of the method for injecting a corrosion inhibitor of the present invention in that it is not necessary to inject the oxidant into the high temperature water and that the anticorrosive agent generates an oxidant from the high temperature water by irradiation with a radioactive ray or an ultraviolet ray, and other features are the same. Therefore, the description of the same constituents and the same operation as the constituents and the operation of the first embodiment in the description of the constituents and the operation of the second embodiment will be omitted or simplified.

The reason why it is not necessary to inject the oxidant into the high temperature water in the second embodiment of the method for injecting a corrosion inhibitor of the present invention is that the anticorrosive agent generates an oxidant from the high temperature water by the irradiation with a radioactive ray or an ultraviolet ray.

Therefore, according to the second embodiment, since it is not necessary to inject the oxidant into the high temperature water, the second embodiment is economical, and the lowering of the purity of the high temperature water caused by an impurity derived from the injected oxidant and remaining in the high temperature water is suppressed.

In the second embodiment, the oxidant that the anticorrosive agent generates in the high temperature water by irradiation with a radioactive ray or an ultraviolet ray is usually at least any one of a superoxide radical $.O^{2-}$ and a hydroxyl radical .OH. The superoxide radical $.O^{2-}$ and the hydroxyl radical .OH are generated from water in the high temperature water by photocatalytic reaction caused by the anticorrosive agent of the anticorrosive agent-pH adjusting agent complex by irradiation with a radioactive ray or an ultraviolet ray.

(Operation)

The operation of the second embodiment of the method for injecting a corrosion inhibitor of the present invention will be described with reference to FIG. 1 to FIG. 4.

In the second embodiment of the method for injecting a corrosion inhibitor of the present invention, a method for irradiation with a radioactive ray and a method for irradiation with an ultraviolet ray are present. Of the methods, the operation of the method for irradiation with a radioactive ray will be described with reference to FIG. 1 and FIG. 2, and the operation of the method for irradiation an ultraviolet ray will be described with reference to FIG. 3 and FIG. 4. In the first place, the operation of the method for irradiation with a radioactive ray will be described.

<Operation of Method for Irradiation with Radioactive Ray>

As a method for irradiation with a radioactive ray of the present invention in the second embodiment, a method for irradiation with a radioactive ray after injecting the anticorrosive agent-pH adjusting agent complex and a method for injecting the anticorrosive agent-pH adjusting agent complex in a state in which irradiation with a radioactive ray is being carried out are present. In the first place, the operation of the method for irradiation with a radioactive ray after injecting the anticorrosive agent-pH adjusting agent complex will be described.

[Operation of Method for Irradiation with Radioactive Ray after Injecting Anticorrosive Agent-pH Adjusting Agent Complex]

In the second embodiment, the pH adjusting agent 12 that constitutes the anticorrosive agent-pH adjusting agent complex 10 is an alkaline type pH adjusting agent 12A, and the anticorrosive agent-pH adjusting agent complex 10 is an anticorrosive agent-pH adjusting agent complex 10A comprising an anticorrosive agent 11 and an alkaline type pH adjusting agent 12A.

Initially, the pH of the high temperature water 60 is adjusted by the alkaline type pH adjusting agent 12A to be alkaline in such a state that the anticorrosive agent-pH adjusting agent complex 10A comprising the anticorrosive agent 11 and the alkaline type pH adjusting agent 12A is injected into the high temperature water 60 in a radiation field 70 as illustrated in FIG. 1A and FIG. 2A and that is before irradiation with a radioactive ray 75 illustrated in FIG. 1A is carried out.

In addition, a state in which all of the alkaline type pH adjusting agents 12A are adsorbed on the anticorrosive agent 11 of the anticorrosive agent-pH adjusting agent complex 10A is illustrated in FIG. 1A, however, a part of the alkaline type pH adjusting agents 12A of the anticorrosive agent-pH adjusting agent complex 10A may be desorbed from the anticorrosive agent 11 and present in the high temperature water 60 in the present invention.

Next, when the high temperature water 60 in a radiation field 70 is irradiated with a radioactive ray 75, the anticorrosive agent 11 in the anticorrosive agent-pH adjusting agent complex 10A causes photocatalytic reaction, and an oxidant 25 such as a superoxide radical $.O^{2-}$ and a hydroxyl radical .OH is generated from the high temperature water 60 on or near the surface of the anticorrosive agent 11 by the photocatalytic reaction as illustrated in FIG. 1A.

The oxidant 25 generated in the high temperature water 60 oxidizes the alkaline type pH adjusting agent 12A of the anticorrosive agent-pH adjusting agent complex 10A as illustrated in FIG. 1A.

The alkaline type pH adjusting agent 12A of the anticorrosive agent-pH adjusting agent complex 10A is converted to the oxidation product 42 of the pH adjusting agent when oxidized with the oxidant 25 as illustrated in FIG. 2B. The pH adjusting ability of the oxidation product 42 of the pH adjusting agent by which pH adjusting ability the pH of the high temperature water 60 is made alkaline becomes smaller compared with the pH adjusting ability of the alkaline type pH adjusting agent 12A before the oxidation, and therefore the pH of the high temperature water 60 is shifted from the alkaline side to the neutral side.

Since the operation after the photocatalytic reaction is the same as the operation of the method for irradiation with a radioactive ray after the anticorrosive agent-pH adjusting agent complex and the oxidant are injected among the methods for irradiation with a radioactive ray in the first embodiment of the method for injecting a corrosion inhibitor of the present invention, the description is omitted.

[Operation of Method for Injecting Anticorrosive Agent-pH Adjusting Agent Complex in State in which Irradiation with Radioactive Ray is being Carried Out]

Next, the operation of the method for injecting the anticorrosive agent-pH adjusting agent complex in a state in which irradiation with a radioactive ray is being carried out in the second embodiment will be described.

Among the methods for irradiation with a radioactive ray in the second embodiment, the operation of the method for injecting the anticorrosive agent-pH adjusting agent complex is different in that the oxidant in the high temperature water quickly oxidizes the alkaline type pH adjusting agent of the anticorrosive agent-pH adjusting agent complex when compared with the operation of the method for irradiation with a radioactive ray after the anticorrosive agent-pH adjusting agent complex is injected among the methods for irradiation with a radioactive ray in the second embodiment of the present invention, and other operation is the same. Therefore, the description will be omitted or simplified with regard to the parts where operation is the same.

The operation will be described with reference to FIG. 1 and FIG. 2.

Initially, when the anticorrosive agent-pH adjusting agent complex 10A comprising the anticorrosive agent 11 and the alkaline type pH adjusting agent 12A is injected into the high temperature water 60 in a radiation field 70, the anticorrosive agent-pH adjusting agent complex 10A is present in the high temperature water 60 as illustrated in FIG. 1A and FIG. 2A. Therefore, the pH of the high temperature water 60 is adjusted by the alkaline type pH adjusting agent 12A to become alkaline immediately after the anticorrosive agent-pH adjusting agent complex 10A is injected into the high temperature water 60.

However, since the high temperature water 60 in a radiation field 70 is irradiated with a radioactive ray 75, the anticorrosive agent 11 of the anticorrosive agent-pH adjusting agent complex 10A in the high temperature water 60 quickly causes photocatalytic reaction. The oxidant 25 such as a superoxide radical $.O^{2-}$ and a hydroxyl radical .OH is generated from the high temperature water 60 on or near the surface of the anticorrosive agent 11 by the photocatalytic reaction.

The oxidant generated from inside the high temperature water 60 oxidizes the pH adjusting agent 12A of the anticorrosive agent-pH adjusting agent complex 10A as illustrated in FIG. 1A.

The alkaline type pH adjusting agent 12A of the anticorrosive agent-pH adjusting agent complex 10A is converted to the oxidation product 42 of the pH adjusting agent when oxidized with the oxidant 25 as illustrated in FIG. 2B. The pH adjusting ability of the oxidation product 42 of the pH adjusting agent by which pH adjusting ability the pH of the high temperature water 60 is made alkaline becomes smaller compared with the pH adjusting ability of the alkaline type pH adjusting agent 12A before the oxidation, and therefore the pH of the high temperature water 60 is shifted from the alkaline side to the neutral side.

Since the operation after the photocatalytic reaction is the same as the operation of the method for irradiation with a radioactive ray after the anticorrosive agent-pH adjusting agent complex and the oxidant are injected among the methods for irradiation with a radioactive ray in the first embodiment of the method for injecting a corrosion inhibitor of the present invention, the description is omitted.

<Operation of Method for Irradiation with Ultraviolet Ray in the Second Embodiment>

The operation of the method for irradiation with an ultraviolet ray will be described.

As a method for irradiation with an ultraviolet ray in the second embodiment of the present invention, a method for irradiation with an ultraviolet ray after injecting the anticorrosive agent-pH adjusting agent complex and a method for injecting the anticorrosive agent-pH adjusting agent complex in a state in which irradiation with an ultraviolet ray is being carried out are present.

The operation of the method for irradiation with an ultraviolet ray in the second embodiment of the present invention is the same as the operation of the method for irradiation with a radioactive ray in the second embodiment when compared with the operation of the method for irradiation with a radioactive ray in the second embodiment except that the radiation field 70 is changed to the ultraviolet ray irradiation environment 80 and that the radioactive ray 75 is changed to the ultraviolet ray 85.

Namely, the operation of the method for irradiation with an ultraviolet ray in the second embodiment of the method for injecting a corrosion inhibitor of the present invention can be described by replacing FIG. 1 with FIG. 3, FIG. 2 with FIG.

4, radiation field 70 with ultraviolet ray irradiation environment 80, and radioactive ray 75 with ultraviolet ray 85 in the description part of the operation of the method for irradiation with a radioactive ray in the second embodiment.

Specifically, among methods for irradiation with an ultraviolet ray in the second embodiment of the method for injecting a corrosion inhibitor of the present invention, the operation in both cases of the method for irradiation with an ultraviolet ray after injecting the anticorrosive agent-pH adjusting agent complex and the method for injecting the anticorrosive agent-pH adjusting agent complex in a state in which irradiation with an ultraviolet ray is being carried out can be described by the above replacement.

Hereinafter, the description of the operation of the method for irradiation with an ultraviolet ray in the second embodiment of the method for injecting a corrosion inhibitor of the present invention will be omitted.

(Effect of the Second Embodiment)

According to the second embodiment of the method for injecting a corrosion inhibitor of the present invention, the deposition rate of the anticorrosive agent 11 to the metal structural material 65 is accelerated compared with the case of the conventional method for injecting a corrosion inhibitor.

Moreover, according to the second embodiment, since it is not necessary to inject the oxidant into the high temperature water, the second embodiment of the present invention is economical, and the lowering of the purity of the high temperature water caused by an impurity derived from the injected oxidant and remaining in the high temperature water is suppressed when compared with the case of the first embodiment of the present invention.

Third Embodiment

The third embodiment of the method for injecting a corrosion inhibitor of the present invention is a method for injecting a corrosion inhibitor injecting a reductant and an anticorrosive agent-pH adjusting agent complex comprising an anticorrosive agent and a pH adjusting agent adhered to a surface of the anticorrosive agent into high temperature water in contact with a surface of a metal structural material and irradiating the high temperature water with a radioactive ray or an ultraviolet ray.

The third embodiment of the method for injecting a corrosion inhibitor of the present invention is different when compared with the first embodiment of the method for injecting a corrosion inhibitor of the present invention in that the reductant is injected into the high temperature water instead of injecting the oxidant into the high temperature water; that the anticorrosive agent of the anticorrosive agent-pH adjusting agent complex has an active site where the pH adjusting agent reacts with the reductant; that a p-type semiconductor is preferable as an anticorrosive agent that constitutes the anticorrosive agent-pH adjusting agent complex; that an acidic type pH adjusting agent is preferable as a pH adjusting agent that constitutes the anticorrosive agent-pH adjusting agent; and that the pH adjusting agent present on the surface of the anticorrosive agent-pH adjusting agent complex and/or in the high temperature water is reduced with the reductant by irradiation with a radioactive ray or an ultraviolet ray to change the pH adjusting ability of the pH adjusting agent, and the other features are the same.

Therefore, the description of the same constituents and the same operation as the constituents and the operation of the first embodiment in the description of the constituents and the operation of the third embodiment of the method for injecting a corrosion inhibitor of the present invention will be omitted or simplified.

As the metal structural material and high temperature water used in the third embodiment, the same metal structural material and the same high temperature water used in the first embodiment are used.

The temperature of the high temperature water is usually 100 to 350° C., preferably 120 to 180° C. It is preferable that the temperature of the high temperature water is 100 to 350° C. because the pH adjusting agent adhered to the surface of the anticorrosive agent in the anticorrosive agent-pH adjusting agent complex is desorbed from the surface of the anticorrosive agent and changes the surface energy of the anticorrosive agent and the anticorrosive agent is easily adhered to the metal structural material. Moreover, it is preferable that the temperature of the high temperature water is 100 to 350° C. because the pH adjusting agent adhered to the surface of the anticorrosive agent in the anticorrosive agent-pH adjusting agent complex or present in the high temperature water is easily reduced with a reductant.

(Anticorrosive Agent-pH Adjusting Agent Complex)

The anticorrosive agent-pH adjusting agent complex is injected into the high temperature water in the third embodiment of the method for injecting a corrosion inhibitor of the present invention. The anticorrosive agent-pH adjusting agent complex comprises an anticorrosive agent and a pH adjusting agent adsorbed on a surface of the anticorrosive agent.

<Anticorrosive Agent>

The anticorrosive agent is a solid substance adhered to a metal structural material and imparting corrosion prevention effect to the metal structural material. As the anticorrosive agent, a photocatalyst having sufficient corrosion prevention effect to the metal structural material and causing photocatalytic reaction by irradiation with a radioactive ray or an ultraviolet ray is used. Moreover, a semiconductor for example is used as the photocatalyst.

Among semiconductors, a p-type semiconductor causes the photocatalytic reaction by irradiation with a radioactive ray or an ultraviolet ray, generates a reductant from the high temperature water on the surface of the p-type semiconductor and in the high temperature water near the surface of the p-type semiconductor, and increases the amount of the reductant, and thereby the deposition rate of the anticorrosive agent to the metal structural material is increased.

As the p-type semiconductor, one or more oxides selected from iron oxide $Fe_3O_4$, chromium oxide $Cr_2O_3$, and nickel oxide NiO for example are used. The iron oxide $Fe_3O_4$, the chromium oxide $Cr_2O_3$, and the nickel oxide NiO are preferable because the iron oxide $Fe_3O_4$, the chromium oxide $Cr_2O_3$, and the nickel oxide NiO have high photocatalytic performance and are stable.

The form of the anticorrosive agent is not particularly limited but is usually powder form. In the case where the anticorrosive agent is powder form, the average particle diameter of the anticorrosive agent is usually 1 μm or less, preferably 0.02 μm to 1 μm, more preferably 0.02 μm to 0.3 μm.

It is preferable that the average particle diameter of the anticorrosive agent is 1 μm or less because the anticorrosive agent is easily adhered to the surface of the metal structural material and the surface area of the anticorrosive agent becomes large and thereby the effect of reducing the corrosive potential of the metal structural material becomes large.

The anticorrosive agent has, on the surface thereof, an active site where the pH adjusting agent adsorbed on the anticorrosive agent reacts with the reductant. Here the active site means a surface on which the anticorrosive agent is exposed and a part where the reaction of the pH adjusting agent with the reductant is caused. Therefore, even if a part is s surface on which the anticorrosive agent is exposed, the part where the reaction of the pH adjusting agent with the reductant is not caused is not the active site. The active site on the surface of the anticorrosive agent is formed by chemical polishing, physical polishing, or the like of the surface of the anticorrosive agent.

<pH Adjusting Agent>

The pH adjusting agent is for adjusting the pH of the high temperature water. In the third embodiment of the method for injecting a corrosion inhibitor of the present invention, an acidic type pH adjusting agent making the pH of the high temperature water low by the addition to the high temperature water is used as the pH adjusting agent.

As the acidic type pH adjusting agent, an inorganic compound or an organic compound containing one or more elements selected from nitrogen, sulfur, and carbon for example is used. Examples of the inorganic compound include formic acid, oxalic acid, carbonic acid, sulfuric acid, and hydrochloric acid, or salts thereof. Examples of the organic compound include citric acid, gluconic acid, and malic acid, or salts thereof.

In addition, in the case where the pH adjusting agent is liquid, the anticorrosive agent-pH adjusting agent complex takes the form in which the pH adjusting agent wets the surface of the anticorrosive agent, and when the anticorrosive agent-pH adjusting agent complex is injected into the high temperature water, the pH adjusting agent is easily desorbed from the surface of the anticorrosive agent. In the examples of the present invention, it is desirable that the pH adjusting agent of the anticorrosive agent-pH adjusting agent complex continues to be adsorbed on the surface of the anticorrosive agent until the pH adjusting agent is reduced by the reductant even though the anticorrosive agent-pH adjusting agent complex is injected into the high temperature water. Therefore, it is preferable that the pH adjusting agent adsorbed on the surface of the anticorrosive agent is in the form of a solid, such as fine particles, that is easily adsorbed on the surface of the anticorrosive agent, or in paste form.

When the anticorrosive agent-pH adjusting agent complex of which pH adjusting agent is an acidic type pH adjusting agent is injected into the high temperature water, the pH of the high temperature water after the anticorrosive agent-pH adjusting agent complex is added becomes acidic before irradiation with a radioactive ray or an ultraviolet ray.

In the case where the pH adjusting agent is an acidic type pH adjusting agent, the pH of the high temperature water into which the anticorrosive agent-pH adjusting agent complex is injected is less than 5 for example.

When the pH adjusting agent is solid or in paste form, the anticorrosive agent-pH adjusting agent complex is obtained by, for example, mixing the anticorrosive agent and the pH adjusting agent and allowing the pH adjusting agent to be adsorbed on the surface of the anticorrosive agent. Here, the meaning that the pH adjusting agent is in paste form includes both of an aspect in which the pH adjusting agent itself is in paste form and an aspect in which the pH adjusting agent itself is solid and the pH adjusting agent is mixed in paste.

When the pH adjusting agent is liquid, the anticorrosive agent-pH adjusting agent complex is obtained by, for example, putting the anticorrosive agent into the pH adjusting agent and allowing the pH adjusting agent to be adsorbed on the anticorrosive agent.

(Reductant)

The reductant is a reductant reducing the pH adjusting agent. As the reductant, one or more selected from lithium aluminum hydride, sodium borohydride, diisobutylaluminum hydride, oxalic acid, formic acid, an iron (II) ion, a tin (II) ion, and a sulfite.

In the third embodiment of the method for injecting a corrosion inhibitor of the present invention, the anticorrosive agent-pH adjusting agent complex and the reductant are injected into the high temperature water in contact with the surface of the metal structural material. The order of the injection of the anticorrosive agent-pH adjusting agent complex and the reductant into the high temperature water is not particularly limited. For example, the anticorrosive agent-pH adjusting agent complex and the reductant may be simultaneously injected into the high temperature water, or after any one of the anticorrosive agent-pH adjusting agent complex and the oxidant is injected, the other may by injected.

(Radioactive Ray or Ultraviolet Ray)

In the third embodiment, the radioactive ray or the ultraviolet ray facilitates the reaction reducing the pH adjusting agent present on the surface of the anticorrosive agent of the anticorrosive agent-pH adjusting agent complex and/or in the high temperature water with the reductant and newly generates a reductant from the high temperature water.

Here, the pH adjusting agent present in the high temperature water means a pH adjusting agent that is desorbed from the surface of the anticorrosive agent of the anticorrosive agent-pH adjusting agent complex and is present in the high temperature water.

Moreover, the meaning of the reductant reducing the pH adjusting agent includes a reductant injected into the high temperature water together with the anticorrosive agent-pH adjusting agent complex and a reductant to be newly generated from the high temperature water.

In addition, the reductant injected into the high temperature water together with the anticorrosive agent-pH adjusting agent complex means, as described above, one or more selected from lithium aluminum hydride, sodium borohydride, diisobutylaluminum hydride, oxalic acid, formic acid, an iron (II) ion, a tin (II) ion, and a sulfite.

As the radioactive ray, an $\alpha$-ray, a $\gamma$-ray, or a neutron ray for example is used. The $\alpha$-ray, the $\gamma$-ray, or the neutron ray is preferable because the $\alpha$-ray, the $\gamma$-ray, or the neutron ray sufficiently facilitates the reduction reaction of the pH adjusting agent by the reductant and newly generates a reductant from the high temperature water at high efficiency.

As the ultraviolet ray, for example, a near-ultraviolet ray of a wavelength of 200 to 380 nm, a far-ultraviolet ray of a wavelength of 100 to 200 nm, or the like is used. It is desirable that the peak wavelength of the near-ultraviolet ray is usually within the range of 200 to 300 nm, preferably within the range of 230 to 270 nm.

In the third embodiment of the present invention, as described above, the pH adjusting ability of the pH adjusting agent is changed by chemically changing the pH adjusting agent by reducing the pH adjusting agent present on the surface of the anticorrosive agent of the anticorrosive agent-pH adjusting agent complex and/or in the high temperature water with the reductant by irradiation with a radioactive ray or an ultraviolet ray. Here, the meaning of the change of the pH adjusting ability includes both losing the pH adjusting ability and the pH adjusting ability becoming weak.

In the third embodiment of the present invention, an acidic type pH adjusting agent making the pH of the high temperature water low by adding the pH adjusting agent to the high temperature water is used as the pH adjusting agent. Therefore, the pH of the high temperature water after the anticorrosive agent-pH adjusting agent complex is added is adjusted by the acidic type pH adjusting agent adhered to the surface of the anticorrosive agent in the anticorrosive agent-pH adjusting agent complex or desorbed from the surface of the anticorrosive agent and present in the high temperature water and becomes acidic before irradiation with a radioactive ray or an ultraviolet ray.

When the acidic type pH adjusting agent is reduced with the reductant and the pH adjusting ability is changed, it becomes difficult to keep the pH of the high temperature water acidic, and therefore the pH of the high temperature water is shifted from an acidic side to a neutral side.

When the pH of the high temperature water is shifted from the acidic side to the neutral side, the aggregation rate of the anticorrosive agent is increased compared with the case where the pH of the high temperature water 60 is acidic, and therefore the deposition rate of the anticorrosive agent to the metal structural material and the deposition rate between the anticorrosive agents are increased.

Therefore, according to the third embodiment of the method for injecting a corrosion inhibitor of the present invention, the deposition rate of the anticorrosive agent to the metal structural material is accelerated compared with the case of the conventional method for injecting a corrosion inhibitor.

It is preferable that the pH of the high temperature water after the pH of the high temperature water is shifted to the neutral side is neutral, weakly acidic, or weakly alkaline because the deposition rate of the anticorrosive agent to the metal structural material is accelerated. Specifically, it is desirable that the pH of the high temperature water after the pH of the high temperature water shifted to the neutral side is usually within the range of 4 to 10, preferably 5 to 9, more preferably 6 to 8.

(Operation)

The operation of the third embodiment of the method for injecting a corrosion inhibitor of the present invention will be described with reference to drawings.

In the third embodiment, a method for irradiation with a radioactive ray and a method for irradiation with an ultraviolet ray are present. In the first place, the operation of the method for irradiation with a radioactive ray will be described.

<Operation of Method for Irradiation with Radioactive Ray>

FIG. 5 is a schematic diagram describing the deposition process of an anticorrosive agent in the case where irradiation with a radioactive ray is carried out in the third embodiment and the fourth embodiment described later of the present invention.

Figure 5A:
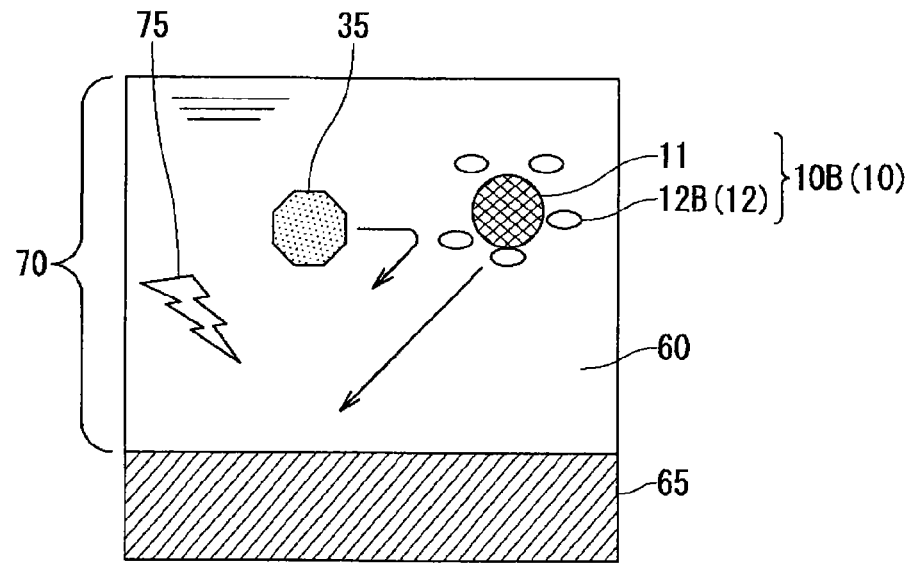
FIGS. 5A and 5B are schematic diagrams each describing deposition process of an anticorrosive agent in the case where irradiation with a radioactive ray is carried out in a third and a fourth embodiment of a method for injecting a corrosion inhibitor of the present invention.
Figure 5B:
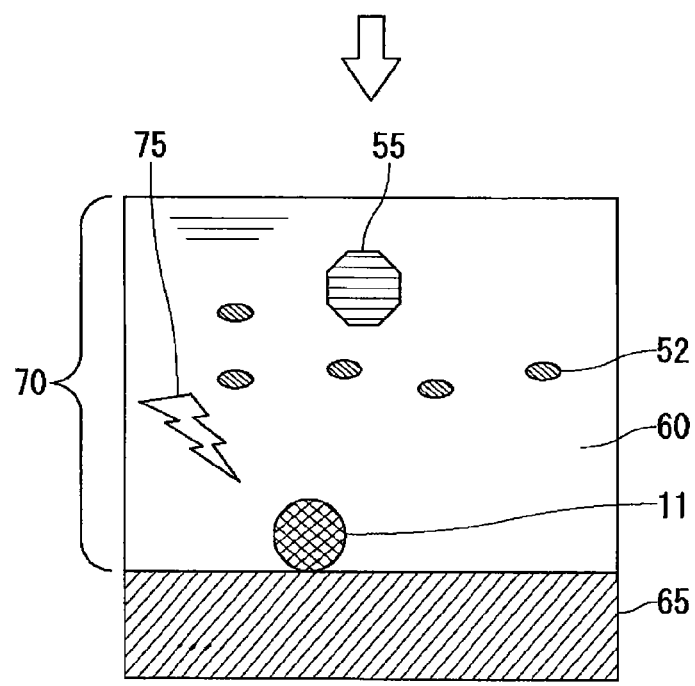

Specifically, FIG. 5A is a schematic diagram schematically illustrating a situation of an anticorrosive agent-pH adjusting agent complex before the anticorrosive agent-pH adjusting agent complex is reduced with a reductant in a radiation field. Moreover, FIG. 5B is a schematic diagram schematically illustrating a situation of an anticorrosive agent-pH adjusting agent complex after the anticorrosive agent-pH adjusting agent complex is reduced with a reductant in a radiation field.

FIG. 6 is a schematic diagram describing the change of an anticorrosive agent-pH adjusting agent complex in the case where irradiation with a radioactive ray is carried out in the third embodiment and the fourth embodiment described later of a method for injecting a corrosion inhibitor of the present invention.

Specifically, FIG. 6A is a schematic diagram schematically illustrating a situation in which an anticorrosive agent-pH adjusting agent complex is present in acidic high temperature water before irradiation with a radioactive ray. Moreover, FIG. 6B is a schematic diagram schematically illustrating a situation in which a pH adjusting agent of an anticorrosive agent-pH adjusting agent complex is reduced to generate a reduction product of the pH adjusting agent and a pH of high temperature water is shifted to a neutral side after irradiation with a radioactive ray. Furthermore, FIG. 6C is a schematic diagram schematically illustrating a situation in which the reduction product of the pH adjusting agent is desorbed from the anticorrosive agent in neutral, weakly acidic, or weakly alkaline high temperature water after irradiation with a radioactive ray.

In addition, as a method for irradiation with a radioactive ray in the third embodiment, a method for irradiation with a radioactive ray after injecting the anticorrosive agent-pH adjusting agent complex and the reductant and a method for injecting the anticorrosive agent-pH adjusting agent complex and the reductant in a state in which irradiation with a radioactive ray is being carried out are present. In the first place, the operation of the method for irradiation with a radioactive ray after injecting the anticorrosive agent-pH adjusting agent complex and the reductant will be described.

[Operation of Method for Irradiation with Radioactive Ray after Injecting Anticorrosive Agent-pH Adjusting Agent Complex and Reductant]

In the third embodiment, the pH adjusting agent 12 that constitutes the anticorrosive agent-pH adjusting agent complex 10 is an acidic type pH adjusting agent 12B, and the anticorrosive agent-pH adjusting agent complex 10 is an anticorrosive agent-pH adjusting agent complex 10B comprising an anticorrosive agent 11 and an acidic type pH adjusting agent 12B.

Initially, the pH of the high temperature water 60 is adjusted by the acidic type pH adjusting agent 12B to be acidic in such a state that the anticorrosive agent-pH adjusting agent complex 10B comprising the anticorrosive agent 11 and the acidic type pH adjusting agent 12B and the reductant 35 are injected into the high temperature water 60 in a radiation field 70 as illustrated in FIG. 5A and FIG. 6A and that is before irradiation with a radioactive ray 75 illustrated in FIG. 5A is carried out.

In addition, a state in which all of the acidic type pH adjusting agents 12B are adsorbed on the anticorrosive agent 11 of the anticorrosive agent-pH adjusting agent complex 10B is illustrated in FIG. 5A, however, a part of the acidic type pH adjusting agents 12B of the anticorrosive agent-pH adjusting agent complex 10B may be desorbed from the anticorrosive agent 11 and present in the high temperature water 60 in the present invention.

Next, when the high temperature water 60 in a radiation field 70 is irradiated with a radioactive ray 75, the reductant 35 in the high temperature water 60 comes close to the anticorrosive agent-pH adjusting agent complex 10B and reduces the acidic type pH adjusting agent 12B of the anticorrosive agent-pH adjusting agent complex 10B as illustrated in FIG. 5A.

Moreover, the anticorrosive agent 11 of the anticorrosive agent-pH adjusting agent complex 10B causes photocatalytic reaction by irradiation with the radioactive ray 75. The reductant 35 is generated from the high temperature water 60 on or near the surface of the anticorrosive agent 11 by the photocatalytic reaction. Therefore, the reductant 35 generated from inside the high temperature water 60 by the photocatalytic reaction is included in the reductant 35 in the high temperature water 60 in addition to the reductant 35 injected into the high temperature water 60.

The acidic type pH adjusting agent 12B of the anticorrosive agent-pH adjusting agent complex 10B is converted to the reduction product 52 of the pH adjusting agent when reduced with the reductant 35 as illustrated in FIG. 6B. The pH adjusting ability of the reduction product 52 of the pH adjusting agent by which pH adjusting ability the pH of the high temperature water 60 is made acidic becomes smaller compared with the pH adjusting ability of the acidic type pH adjusting agent 12B before the reduction, and therefore the pH of the high temperature water 60 is shifted from the acidic side to the neutral side.

When the reduction of the acidic type pH adjusting agent 12B by the reductant 35 sufficiently proceeds; the pH adjusting ability of the acidic type pH adjusting agent 12B is changed; and the pH of the high temperature water 60 is greatly shifted to the neutral side, the reduction product 52 of the pH adjusting agent generated from the acidic type pH adjusting agent 12B is desorbed from the anticorrosive agent 11 as illustrated in FIG. 5B and FIG. 6C. The exposed anticorrosive agent 11 from which the reduction product 52 of the pH adjusting agent is desorbed adheres to the surface of the metal structural material 65 as illustrated in FIG. 5B.

In addition, when the pH of the high temperature water 60 is greatly shifted to the neutral side to become neutral, weakly acidic, or weakly basic, the aggregation rate of the anticorrosive agent 11 is increased compared with the case where the pH of the high temperature water is acidic, and therefore the deposition rate of the anticorrosive agent 11 to the metal structural material 65 and deposition rate between the anticorrosive agents 11 are increased in the third embodiment of the method for injecting a corrosion inhibitor of the present invention compared with the case of the conventional method.

Here, to be neutral, weakly acidic, or weakly alkaline specifically means that the pH of the high temperature water 60 is usually within the range of 4 to 10, preferably 5 to 9, more preferably 6 to 8.

Moreover, when the pH of the high temperature water 60 is greatly shifted to the neutral side to become neutral, weakly acidic, or weakly alkaline, the surface potential of the anticorrosive agent 11 is reduced, and therefore the third embodiment of the method for injecting a corrosion inhibitor of the present invention enhances the corrosion prevention effect of the anticorrosive agent 11 to the metal structural material 65 compared with the conventional method.

The reductant 35 itself is oxidized when the reductant reduces the acidic type pH adjusting agent 12B of the anticorrosive agent-pH adjusting agent complex 10B to become an oxidation product 55 of the reductant as illustrated in FIG. 5B.

[Operation of Method for Injecting Anticorrosive Agent-pH Adjusting Agent Complex and Reductant in State in which Irradiation with Radioactive Ray is being Carried Out]

Next, the operation of the method for injecting the anticorrosive agent-pH adjusting agent complex and the reductant in a state in which irradiation with a radioactive ray is being carried out will be described.

In the method for irradiation with a radioactive ray in the third embodiment of the present invention, the operation of the method for injecting the anticorrosive agent-pH adjusting agent complex and the reductant in a state in which irradiation with a radioactive ray is being carried out is different in that the reductant in the high temperature water quickly reduces the acidic type pH adjusting agent of the anticorrosive agent-pH adjusting agent complex when compared with the operation of the method for irradiation with a radioactive ray after the anticorrosive agent-pH adjusting agent complex and the reductant are injected in the method for irradiation with a radioactive ray in the third embodiment, and other operation is the same. Therefore, the description will be omitted or simplified with regard to the parts where operation is the same.

The operation will be described with reference to FIG. 5 and FIG. 6.

Initially, when the anticorrosive agent-pH adjusting agent complex 10B comprising the anticorrosive agent 11 and the acidic type pH adjusting agent 12B and the reductant 35 are injected into the high temperature water 60 in a radiation field 70, the anticorrosive agent-pH adjusting agent complex 10B and the reductant 35 are present in the high temperature water 60 as illustrated in FIG. 5A and FIG. 6A. Therefore, the pH of the high temperature water 60 is adjusted by the acidic type pH adjusting agent 12B to become acidic in a state in which the acidic type pH adjusting agent 12B is not sufficiently reduced by the reductant 35 immediately after the anticorrosive agent-pH adjusting agent complex 10B and the reductant 35 are injected into the high temperature water 60.

However, since the high temperature water 60 in a radiation field 70 is irradiated with a radioactive ray 75, the reductant 35 in the high temperature water 60 quickly comes close to the anticorrosive agent-pH adjusting agent complex 10B and reduces the acidic type pH adjusting agent 12B of the anticorrosive agent-pH adjusting agent complex 10B as illustrated in FIG. 5A.

Moreover, since the high temperature water 60 in the radiation field 70 is irradiated with the radioactive ray 75, the anticorrosive agent 11 of the anticorrosive agent-pH adjusting agent complex 10B quickly causes the photocatalytic reaction. The reductant 35 is also generated from the high temperature water 60 by the photocatalytic reaction.

Therefore, the reductant 35 generated from inside the high temperature water 60 by the photocatalytic reaction is included in the reductant 35 in the high temperature water 60 in addition to the reductant 35 injected into the high temperature water 60.

Since the operation after the photocatalytic reaction is the same as the operation of the method for irradiation with a radioactive ray after the anticorrosive agent-pH adjusting agent complex and the reductant are injected among the methods for irradiation with a radioactive ray in the third embodiment of the method for injecting a corrosion inhibitor of the present invention, the description is omitted.

<Operation of Method for Irradiation with Ultraviolet Ray>

The operation of the method for irradiation with an ultraviolet ray will be described.

FIG. 7 is a schematic diagram describing the deposition process of an anticorrosive agent in the case where irradiation with an ultraviolet ray is carried out in the third embodiment and the fourth embodiment described later of the present invention.

Figure 7A:
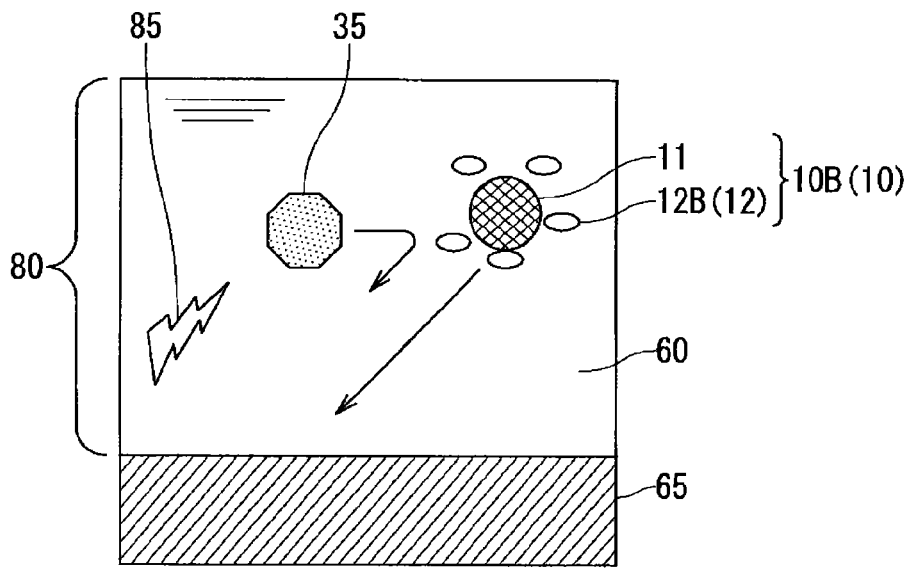
FIGS. 7A and 7B are schematic diagrams each describing deposition process of an anticorrosive agent in the case where irradiation with an ultraviolet ray is carried out in a third and a fourth embodiment of a method for injecting a corrosion inhibitor of the present invention.
Figure 7B:
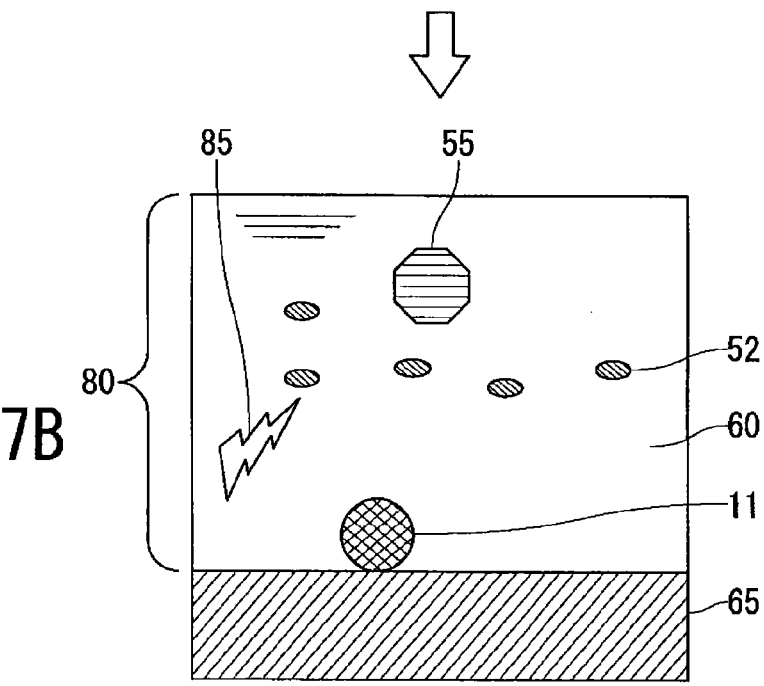

Specifically, FIG. 7A is a schematic diagram schematically illustrating a situation of an anticorrosive agent-pH adjusting agent complex before the anticorrosive agent-pH adjusting agent complex is reduced by a reductant in an ultraviolet ray irradiation environment. Moreover, FIG. 7B is a schematic diagram schematically illustrating a situation of an anticorrosive agent-pH adjusting agent complex after the anticorrosive agent-pH adjusting agent complex is reduced by a reductant in an ultraviolet ray irradiation environment.

In addition, FIG. 7 is the same as FIG. 5 when compared with FIG. 5 except that the radiation field 70 is changed to the ultraviolet ray irradiation environment 80 and that the radioactive ray 75 is changed to the ultraviolet ray 85, and therefore the same constituents are designated as the same signs, and the description of constituents is omitted.

FIG. 8 is a schematic diagram describing the change of an anticorrosive agent-pH adjusting agent complex in the case where irradiation with an ultraviolet ray is carried out in the third embodiment and the fourth embodiment described later of the method for injecting a corrosion inhibitor of the present invention.

Specifically, FIG. 8A is a schematic diagram schematically illustrating a situation in which an anticorrosive agent-pH adjusting agent complex is present in acidic high temperature water before irradiation with an ultraviolet ray. Moreover, FIG. 8B is a schematic diagram schematically illustrating a situation in which a pH adjusting agent of an anticorrosive agent-pH adjusting agent complex is reduced to generate a reduction product of the pH adjusting agent and a pH of high temperature water is shifted to a neutral side after irradiation with an ultraviolet ray. Furthermore, FIG. 8C is a schematic diagram schematically illustrating a situation in which the reduction product of the pH adjusting agent is desorbed from the anticorrosive agent in neutral, weakly acidic, or weakly alkaline high temperature water after irradiation with an ultraviolet ray.

In addition, FIG. 8 is the same as FIG. 6 when compared with FIG. 6 except that the radioactive ray 75 is changed to the ultraviolet ray 85, and therefore the same constituents are designated as the same signs, and the description of constituents is omitted.

As a method for irradiation with an ultraviolet ray in the third embodiment of the present invention, a method for irradiation with an ultraviolet ray after injecting the anticorrosive agent-pH adjusting agent complex and the reductant and a method for injecting the anticorrosive agent-pH adjusting agent complex and the reductant in a state in which irradiation with an ultraviolet ray is being carried out are present.

The operation of the method for irradiation with an ultraviolet ray in the above methods is the same as the operation of the method for irradiation with a radioactive ray in the third embodiment when compared with the operation of the method for irradiation with a radioactive ray in the third embodiment except that the radiation field 70 is changed to the ultraviolet ray irradiation environment 80 and that the radioactive ray 75 is changed to the ultraviolet ray 85.

Namely, the operation of the method for irradiation with an ultraviolet ray in the third embodiment of the present invention can be described by replacing FIG. 5 with FIG. 7, FIG. 6 with FIG. 8, radiation field 70 with ultraviolet ray irradiation environment 80, and radioactive ray 75 with ultraviolet ray 85 in the description part of the operation of the method for irradiation with a radioactive ray in the third embodiment.

Specifically, among methods for irradiation with an ultraviolet ray in the third embodiment of the method for injecting a corrosion inhibitor of the present invention, the operation in both cases of the method for irradiation with an ultraviolet ray after injecting the anticorrosive agent-pH adjusting agent complex and the reductant and the method for injecting the anticorrosive agent-pH adjusting agent complex and the reductant in a state in which irradiation with an ultraviolet ray is being carried out can be described by the above replacement.

Therefore, the description of the operation of the method for irradiation with an ultraviolet ray in the third embodiment of the method for injecting a corrosion inhibitor of the present invention is omitted.

(Effect of the Third Embodiment)

According to the third embodiment of the method for injecting a corrosion inhibitor of the present invention, the deposition rate of the anticorrosive agent 11 to the metal structural material 65 is accelerated compared with the case of the conventional method for injecting a corrosion inhibitor.

Fourth Embodiment

The fourth embodiment of the method for injecting a corrosion inhibitor of the present invention is a method for injecting a corrosion inhibitor injecting an anticorrosive agent-pH adjusting agent complex comprising an anticorrosive agent and a pH adjusting agent adhered to a surface of the anticorrosive agent into high temperature water in contact with a surface of a metal structural material and irradiating the high temperature water with a radioactive ray or an ultraviolet ray, wherein the anticorrosive agent generates a reductant from the high temperature water by the irradiation with the radioactive ray or the ultraviolet ray.

The fourth embodiment of the present invention is different when compared with the third embodiment of the present invention in that it is not necessary to inject the reductant into the high temperature water and that the anticorrosive agent generates a reductant from the high temperature water by irradiation with a radioactive ray or an ultraviolet ray, and other features are the same. Therefore, the description of the same constituents and the same operation as the constituents and the operation of the third embodiment in the description of the constituents and the operation of the fourth embodiment of the present invention will be omitted or simplified.

The reason why it is not necessary to inject the reductant into the high temperature water in the fourth embodiment of the present invention is that the anticorrosive agent generates a reductant from the high temperature water by the irradiation with a radioactive ray or an ultraviolet ray.

Therefore, according to the fourth embodiment, since it is not necessary to inject the reductant into the high temperature water, the fourth embodiment is economical, and the lowering of the purity of the high temperature water caused by an impurity derived from the injected reductant and remaining in the high temperature water is suppressed.

(Operation)

The operation of the fourth embodiment of the method for injecting a corrosion inhibitor of the present invention will be described with reference to FIG. 5 to FIG. 8.

In the fourth embodiment of the present invention, a method for irradiation with a radioactive ray and a method for irradiation with an ultraviolet ray are present. Of the methods, the operation of the method for irradiation with a radioactive ray will be described with reference to FIG. 5 and FIG. 6, and the operation of the method for irradiation an ultraviolet ray will be described with reference to FIG. 7 and FIG. 8. In the first place, the operation of the method for irradiation with a radioactive ray will be described.

<Operation of Method for Irradiation with Radioactive Ray>

As a method for irradiation with a radioactive ray in the fourth embodiment of the method for injecting a corrosion inhibitor of the present invention, a method for irradiation with a radioactive ray after injecting the anticorrosive agent-pH adjusting agent complex and a method for injecting the anticorrosive agent-pH adjusting agent complex in a state in which irradiation with a radioactive ray is being carried out are present. In the first place, the operation of the method for irradiation with a radioactive ray after injecting the anticorrosive agent-pH adjusting agent complex will be described.

[Operation of Method for Irradiation with Radioactive Ray after Injecting Anticorrosive Agent-pH Adjusting Agent Complex]

In the fourth embodiment, the pH adjusting agent 12 that constitutes the anticorrosive agent-pH adjusting agent complex 10 is an acidic type pH adjusting agent 12B, and the anticorrosive agent-pH adjusting agent complex 10 is an anticorrosive agent-pH adjusting agent complex 10B comprising an anticorrosive agent 11 and an acidic type pH adjusting agent 12B.

Initially, the pH of the high temperature water 60 is adjusted by the acidic type pH adjusting agent 12B to be acidic in such a state that the anticorrosive agent-pH adjusting agent complex 10B comprising the anticorrosive agent 11 and the acidic type pH adjusting agent 12B is injected into the high temperature water 60 in a radiation field 70 as illustrated in FIG. 5A and FIG. 6A and that is before irradiation with a radioactive ray 75 illustrated in FIG. 5A is carried out.

In addition, a state in which all of the acidic type pH adjusting agents 12B are adsorbed on the anticorrosive agent 11 of the anticorrosive agent-pH adjusting agent complex 10B is illustrated in FIG. 5A, however a part of the acidic type pH adjusting agents 12B of the anticorrosive agent-pH adjusting agent complex 10B may be desorbed from the anticorrosive agent 11 and present in the high temperature water 60 in the present invention.

Next, when the high temperature water 60 in a radiation field 70 is irradiated with a radioactive ray 75, the anticorrosive agent 11 in the anticorrosive agent-pH adjusting agent complex 10B in the high temperature water 60 causes photocatalytic reaction, and a reductant 35 is generated from the high temperature water 60 on or near the surface of the anticorrosive agent 11 by the photocatalytic reaction as illustrated in FIG. 5A.

The reductant 35 generated in the high temperature water 60 reduces the acidic type pH adjusting agent 12B of the anticorrosive agent-pH adjusting agent complex 10B as illustrated in FIG. 5A.

The acidic type pH adjusting agent 12B of the anticorrosive agent-pH adjusting agent complex 10B is converted to the reduction product 52 of the pH adjusting agent when reduced with the reductant 35 as illustrated in FIG. 6B. The pH adjusting ability of the reduction product 52 of the pH adjusting agent by which pH adjusting ability the pH of the high temperature water 60 is made acidic becomes smaller compared with the pH adjusting ability of the acidic type pH adjusting agent 12B before the reduction, and therefore the pH of the high temperature water 60 is shifted from the acidic side to the neutral side.

Since the operation after the photocatalytic reaction is the same as the operation of the method for irradiation with a radioactive ray after the anticorrosive agent-pH adjusting agent complex and the reductant are injected among the methods for irradiation with a radioactive ray in the third embodiment of the present invention, the description is omitted.

[Operation of Method for Injecting Anticorrosive Agent-pH Adjusting Agent Complex in State in which Irradiation with Radioactive Ray is being Carried Out]

Next, the operation of the method for injecting the anticorrosive agent-pH adjusting agent complex in a state in which irradiation with a radioactive ray is being carried out will be described.

Among the methods for irradiation with a radioactive ray in the fourth embodiment, the operation of the method for injecting the anticorrosive agent-pH adjusting agent complex in a state in which irradiation with a radioactive ray is being carried out is different in that the reductant in the high temperature water quickly reduces the acidic type pH adjusting agent of the anticorrosive agent-pH adjusting agent complex when compared with the operation of the method for irradiation with a radioactive ray after the anticorrosive agent-pH adjusting agent complex is injected among the methods for irradiation with a radioactive ray in the fourth embodiment, and other operation is the same. Therefore, the description will be omitted or simplified with regard to the parts where operation is the same.

The operation will be described with reference to FIG. 5 and FIG. 6.

Initially, when the anticorrosive agent-pH adjusting agent complex 10B comprising the anticorrosive agent 11 and the acidic type pH adjusting agent 12B is injected into the high temperature water 60 in a radiation field 70, the anticorrosive agent-pH adjusting agent complex 10B is present in the high temperature water 60 as illustrated in FIG. 5A and FIG. 6A. Therefore, the pH of the high temperature water 60 is adjusted by the acidic type pH adjusting agent 12B to become acidic immediately after the anticorrosive agent-pH adjusting agent complex 10B is injected into the high temperature water 60.

However, since the high temperature water 60 in a radiation field 70 is irradiated with a radioactive ray 75, the anticorrosive agent 11 of the anticorrosive agent-pH adjusting agent complex 10B in the high temperature water 60 quickly causes photocatalytic reaction. The reductant 35 is generated from the high temperature water 60 on or near the surface of the anticorrosive agent 11 by the photocatalytic reaction.

The reductant 35 generated in the high temperature water 60 reduces the acidic type pH adjusting agent 12B of the anticorrosive agent-pH adjusting agent complex 10B as illustrated in FIG. 5A.

The acidic type pH adjusting agent 12B of the anticorrosive agent-pH adjusting agent complex 10B is converted to the reduction product 52 of the pH adjusting agent when reduced with the reductant 35 as illustrated in FIG. 6B. The pH adjusting ability of the reduction product 52 of the pH adjusting agent by which pH adjusting ability the pH of the high temperature water 60 is made acidic becomes smaller compared with the pH adjusting ability of the acidic type pH adjusting agent 12B before the reduction, and therefore the pH of the high temperature water 60 is shifted from the acidic side to the neutral side.

Since the operation after the photocatalytic reaction is the same as the operation of the method for irradiation with a radioactive ray after the anticorrosive agent-pH adjusting agent complex and the reductant are injected among the methods for irradiation with a radioactive ray in the third embodiment of the method for injecting a corrosion inhibitor of the present invention, the description is omitted.

<Operation of Method for Irradiation with Ultraviolet Ray>

The operation of the method for irradiation with an ultraviolet ray will be described.

As a method for irradiation with an ultraviolet ray in the fourth embodiment of the present invention, a method for irradiation with an ultraviolet ray after injecting the anticorrosive agent-pH adjusting agent complex and a method for injecting the anticorrosive agent-pH adjusting agent complex in a state in which irradiation with an ultraviolet ray is being carried out are present.

The operation of the method for irradiation with an ultraviolet ray in the fourth embodiment is the same as the operation of the method for irradiation with a radioactive ray in the fourth embodiment when compared with the operation of the method for irradiation with a radioactive ray in the fourth embodiment except that the radiation field 70 is changed to the ultraviolet ray irradiation environment 80 and that the radioactive ray 75 is changed to the ultraviolet ray 85.

Namely, the operation of the method for irradiation with an ultraviolet ray in the fourth embodiment can be described by replacing FIG. 5 with FIG. 7, FIG. 6 with FIG. 8, radiation field 70 with ultraviolet ray irradiation environment 80, and radioactive ray 75 with ultraviolet ray 85 in the description part of the operation of the method for irradiation with a radioactive ray in the fourth embodiment.

Specifically, among methods for irradiation with an ultraviolet ray in the fourth embodiment of the present invention, the operation in both cases of the method for irradiation with an ultraviolet ray after injecting the anticorrosive agent-pH adjusting agent complex and the method for injecting the anticorrosive agent-pH adjusting agent complex in a state in which irradiation with an ultraviolet ray is being carried out can be described by the above replacement.

Therefore, the description of the operation of the method for irradiation with an ultraviolet ray in the fourth embodiment of the method for injecting a corrosion inhibitor of the present invention is omitted.

(Effect of the Fourth Embodiment)

According to the fourth embodiment of the method for injecting a corrosion inhibitor of the present invention, the deposition rate of the anticorrosive agent 11 to the metal structural material 65 is accelerated compared with the case of the conventional method for injecting a corrosion inhibitor.

Moreover, according to the fourth embodiment of the present invention, since it is not necessary to inject the reductant into the high temperature water, the fourth embodiment of the present invention is economical, and the lowering of the purity of the high temperature water caused by an impurity derived from the injected reductant and remaining in the high temperature water is suppressed when compared with the case of the third embodiment of the present invention.

In addition, examples in which irradiation with a radioactive ray and irradiation with an ultraviolet ray are carried out separately have been described in the first to fourth embodiments, however the irradiation with a radioactive ray and the irradiation with an ultraviolet ray may be used together in the first to fourth embodiments. Examples of the method for using the irradiation with a radioactive ray and the irradiation with an ultraviolet ray together include a method in which the irradiation with a radioactive ray and the irradiation with an ultraviolet ray are carried out simultaneously, a method in which the irradiation with an ultraviolet ray is carried out after the irradiation with a radioactive ray, and a method in which the irradiation with a radioactive ray is carried out after the irradiation with an ultraviolet ray.

EXAMPLES

Examples will be shown hereinafter, however the present invention should not be construed as limited to the Examples.

Example 1

Deposition Test of Anticorrosive Agent to Metal Structural Material by Irradiation with Radioactive Ray Oxygen 25 as an oxidant and an anticorrosive agent-pH adjusting agent complex 10A comprising a titanium dioxide $TiO_2$ particle 11 as an anticorrosive agent and an alkaline type pH adjusting agent 12A adsorbed on the surface of the titanium dioxide particle 11 were injected into high temperature water 60 having a temperature of 150° C. in contact with a surface of a SUS 65 as a metal structural material as illustrated in FIG. 1A. After the injection, the pH of the high temperature water 60 was alkaline. In addition, most of the anticorrosive agent-pH adjusting agent complexes 10A in the high temperature water 60 kept a state in which the alkaline type pH adjusting agent 12A was adsorbed on the surface of the titanium dioxide particle 11.

When the high temperature water 60 was irradiated with a γ-ray 75 as a radioactive ray in the above-described state, the alkaline type pH adjusting agent 12A of the anticorrosive agent-pH adjusting agent complex 10A reacted with the oxygen 25 in the radiation field 70.

The alkaline type pH adjusting agent 12A of the anticorrosive agent-pH adjusting agent complex 10A was oxidized with the oxygen 25 and converted to an oxidation product 42 of the pH adjusting agent as illustrated in FIG. 2B. The pH adjusting ability of the oxidation product 42 of the pH adjusting agent by which pH adjusting ability the pH of the high temperature water 60 is made alkaline became weaker compared with the alkaline type pH adjusting agent 12A, and the pH of the high temperature water 60 was shifted from the alkaline side to the neutral side to become weakly alkaline to weakly acidic. On the other hand, the oxygen 25 was reduced and converted to a superoxide radical $.O^{2-}$.

The oxidation product 42 of the pH adjusting agent which oxidation product had been adsorbed on the surface of the titanium dioxide particle 11 was desorbed from the surface of the titanium dioxide particle 11 as illustrated in FIG. 1B and FIG. 2C.

The surface energy of the titanium dioxide particle 11 from which the oxidation product 42 of the pH adjusting agent was desorbed changed. Moreover, the aggregation rate of the titanium dioxide particle 11 was increased and the deposition rate of the titanium dioxide particle to another substance was increased because the pH of the high temperature water 60 was shifted from the alkaline side to the neutral side to become weakly alkaline to weakly acidic. Therefore, the titanium dioxide particle 11 quickly adhered to the surface of the SUS 65 as illustrated in FIG. 1B.

In addition, the oxidation product 42 of the pH adjusting agent and the superoxide radical $.O^{2-}$ were present in the high temperature water 60 after the titanium dioxide particle 11 adhered to the surface of the SUS 65.

Example 2 and Comparative Example 1

Effect with and without Radioactive Ray Irradiation

The titanium dioxide particle 11 was adhered to the surface of the SUS 65 in the same manner as in Example 1 except that hydrogen peroxide as an oxidant was used in place of oxygen (Example 2). In Example 2, the pH of the high temperature water 60 was alkaline after the anticorrosive agent-pH adjusting agent complex 10A and hydrogen peroxide were injected, however the pH of the high temperature water 60 was 7 after irradiation with the γ-ray 75.

Further, as a comparative example, the titanium dioxide particle 11 was adhered to the surface of the SUS 65 in the same manner as in Example 2 except that the irradiation with the γ-ray was not carried out (Comparative Example 1). In Comparative Example 1, the pH of the high temperature water 60 did not change and remained alkaline after the anticorrosive agent-pH adjusting agent complex 10A and hydrogen peroxide were injected.

Furthermore, the amount of deposition of the titanium dioxide particle 11 to the surface of the SUS 65 was measured for Example 2 and Comparative Example 1.

Figure 9:
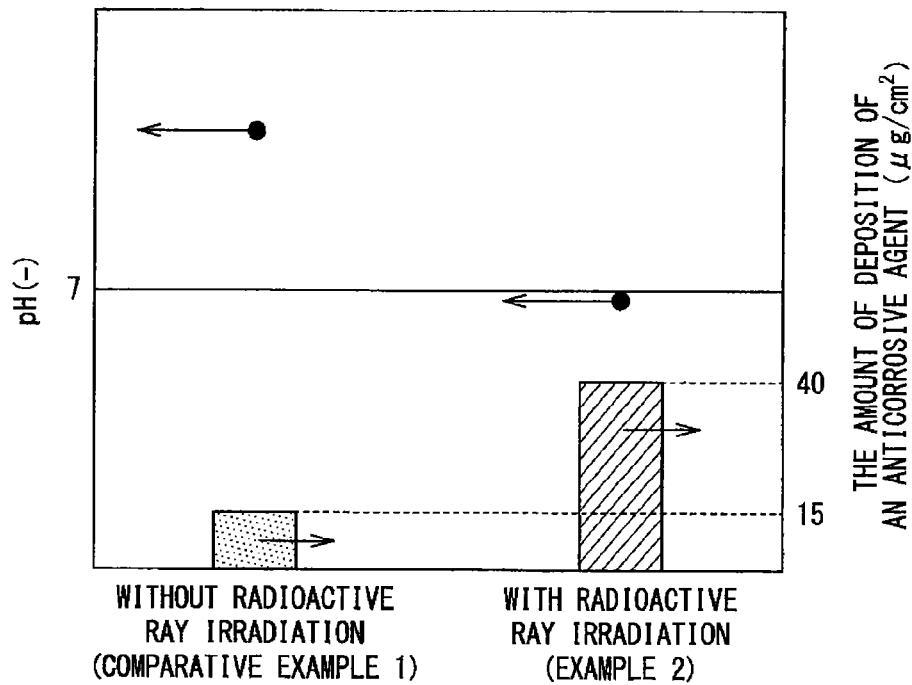
FIG. 9 is a characteristic diagram illustrating a change of the amount of deposition of an anticorrosive agent with and without radioactive ray irradiation.

FIG. 9 is a characteristic diagram illustrating a change of the amount of deposition of the anticorrosive agent with and without radioactive ray irradiation. The pH of the high temperature water and the amount of deposition of the titanium dioxide particle 11 to the surface of the SUS 65 in Example 2 and Comparative Example 1 are illustrated in FIG. 9.

From FIG. 9, it is understood that the pH of the high temperature water is shifted to the neutral side and the amount of deposition of the titanium dioxide particle to the surface of the SUS is also increased when the irradiation with the radioactive ray (γ-ray) is carried out.

Examples 3 and 4, and Comparative Examples 2 and 3

Effect with and without Ultraviolet Radiation

The titanium dioxide particle 11 was adhered to the surface of SUS test piece 65 in the same manner as in Example 2 except that the SUS test piece 65 was used in place of the SUS 65, an ultraviolet ray of 0.2 mW/cm$^2$ having a peak wavelength of 254 nm was used in place of the radioactive ray (γ-ray), and the temperature of the high temperature water was set to 160° C. (Example 3).

Further, the titanium dioxide particle 11 was adhered to the surface of the SUS test piece 65 in the same manner as in Example 3 except that the temperature of the high temperature water 60 was set to 100° C. (Example 4).

Furthermore, the titanium dioxide particle 11 was adhered to the surface of the SUS test piece 65 in the same manner as in Example 3 except that the irradiation with an ultraviolet ray was not carried out (Comparative Example 2).

Moreover, the titanium dioxide particle 11 was adhered to the surface of the SUS test piece 65 in the same manner as in Example 4 except that the irradiation with an ultraviolet ray was not carried out (Comparative Example 3).

The titanium dioxide particle 11 that was an n-type semiconductor generated an oxidant in the high temperature water by irradiation with the ultraviolet ray, and the oxidant oxidized the alkaline type pH adjusting agent 12A in Examples 3 and 4. And the pH of the high temperature water was shifted from the alkaline side to the neutral side and the deposition rate of the titanium dioxide particle 11 to the surface of the SUS test piece 65 was increased by the alkaline type pH adjusting agent 12A being oxidized.

The amount of deposition of the titanium dioxide 11 to the surface of the SUS test piece 65 was measured for Examples 3 and 4, and Comparative Examples 2 and 3.

Figure 10:
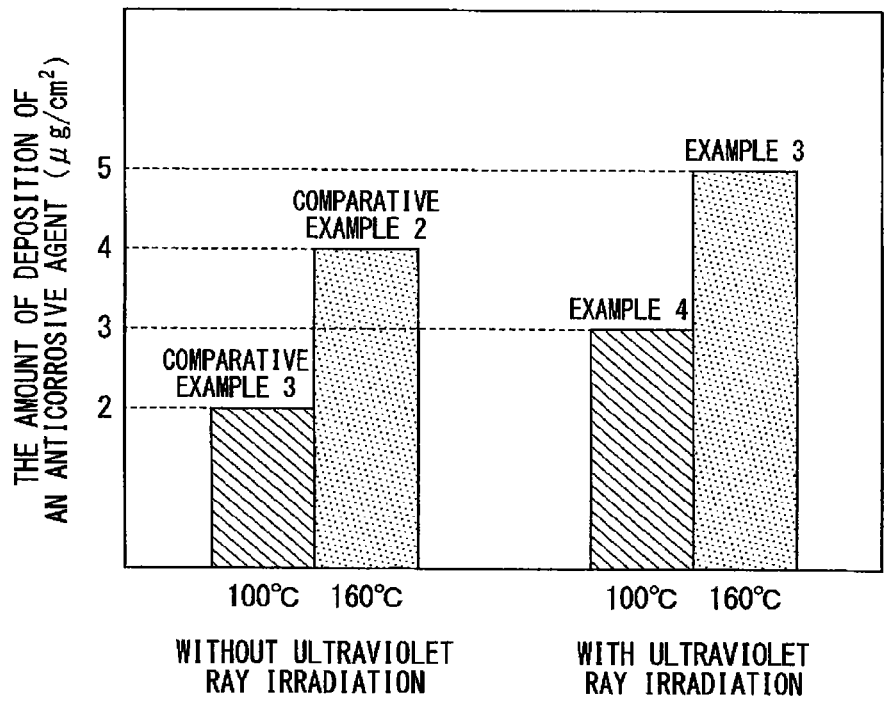
FIG. 10 is a characteristic diagram illustrating a change of the amount of deposition of an anticorrosive agent with and without ultraviolet ray irradiation.

FIG. 10 is a characteristic diagram illustrating a change of the amount of deposition of an anticorrosive agent with and without ultraviolet ray irradiation. The amount of deposition of the titanium dioxide particle to the surface of the SUS test piece in Examples 3 and 4, and Comparative Example 2 and 3 are illustrated in FIG. 10.

From FIG. 10, it is understood that the amount of deposition of the titanium dioxide is increased when irradiation with an ultraviolet ray is carried out compared with the case where the irradiation of the ultraviolet ray is not carried out. It is also understood from FIG. 10 that the amount of deposition of the titanium dioxide particle is increased when the temperature of the high temperature water is high.

Example 5

Effect of pH of High Temperature Water

A reductant 35 and an anticorrosive agent-pH adjusting agent complex 10B comprising an anticorrosive agent 11 and an acidic type pH adjusting agent 12B adsorbed on the surface of the anticorrosive agent 11 were injected into high temperature water 60 having a temperature of 180° C. in contact with the surface of the SUS test piece 65 as a metal structural material as illustrated in FIG. 5A. After the injection, the pH of the high temperature water 60 was acidic and the value of the pH was 4. In addition, most of the anticorrosive agent-pH adjusting agent complexes 10B in the high temperature water kept a state in which the acidic type pH adjusting agent 12B was adsorbed on the surface of the anticorrosive agent 11 as illustrated in FIG. 6A.

When the high temperature water 60 was irradiated with a γ-ray 75 as a radioactive ray in the above-described state, the acidic type pH adjusting agent 12B of the anticorrosive agent-pH adjusting agent complex 10B reacted with the reductant 35 in the radiation field 70.

The acidic type pH adjusting agent 12B of the anticorrosive agent-pH adjusting agent complex 10B was reduced with the reductant 35 and converted to a reduction product 52 of the pH adjusting agent as illustrated in FIG. 6B. The pH adjusting ability of the reduction product 52 of the pH adjusting agent by which pH adjusting ability the pH of the high temperature water 60 is made acidic became weaker compared with the pH adjusting ability of the acidic type pH adjusting agent 12B, and the pH of the high temperature water 60 was shifted from 4 to the neutral side to become 7 finally. On the other hand, the reductant 35 was oxidized and converted to an oxidation product 55.

The reduction product 52 of the pH adjusting agent which reduction product had been adsorbed on the surface of the anticorrosive agent 11 was desorbed from the surface of the anticorrosive agent 11 as illustrated in FIG. 5A and FIG. 5B.

The surface energy of the anticorrosive agent 11 from which the reduction product 52 of the pH adjusting agent was desorbed changed. Moreover, the aggregation rate of the anticorrosive agent 11 was increased and the deposition rate of the anticorrosive agent 11 to another substance was increased because the pH of the high temperature water 60 was shifted from 4, the acidic side, to the neutral side to become 7. Therefore, the anticorrosive agent 11 quickly adhered to the surface of the SUS test piece 65 as illustrated in FIG. 5B.

In addition, the reduction product 52 of the pH adjusting agent and the oxidation product 55 of the reductant were present in the high temperature water 60 after the anticorrosive agent 11 adhered to the surface of the SUS test piece 65.

The amount of deposition of the anticorrosive agent 11 to the surface of the SUS test piece 65 was measured for Example 5.

Figure 11:
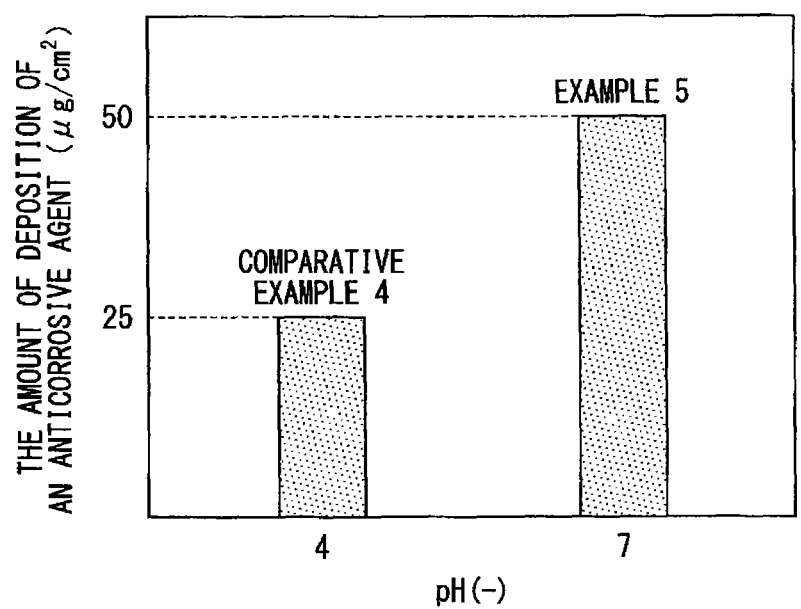
FIG. 11 is a characteristic diagram illustrating a relation between the pH of water and the amount of deposition of an anticorrosive agent.

FIG. 11 is a characteristic diagram illustrating a relation between the pH of water and the amount of deposition of an anticorrosive agent. The amount of deposition of the anticorrosive agent to the surface of the SUS test piece in Example 5 is illustrated in FIG. 11.

Comparative Example 4

Effect of pH of High Temperature Water

The anticorrosive agent 11 was adhered to the surface of the SUS test piece 65 in the same manner as in Example 5 except that the irradiation with a γ-ray was not carried out.

The amount of deposition of the anticorrosive agent 11 to the surface of the SUS test piece 65 was measured for Comparative Example 4.

The amount of deposition of the anticorrosive agent to the surface of the SUS test piece in Comparative Example 4 is illustrated in FIG. 11.

From FIG. 11, it is understood that the amount of deposition of the anticorrosive agent is larger in the case where the pH of the high temperature water is neutral than in the case where the pH of the high temperature water is acidic.

While some embodiments of the present invention have been described, these embodiments have been presented as an example and are not intended to limit the scope of the invention. These novel embodiments may be carried out in other various forms, and various omissions, substitutions, and changes may be made without departing from the gist of the invention. These embodiments and the modifications thereof are included in the scope and gist of the invention and also included in the invention described in the accompanying claims and in the range of equivalents thereof.

INDUSTRIAL APPLICABILITY

The method for injecting a corrosion inhibitor in the respective embodiments of the present invention makes it possible to increase the deposition rate of an anticorrosive agent to a metal structural material and therefore is not limited to the above-described technical field and can be applied to a lot of technical fields, and the industrial applicability is high.

10, 10A, 10B - - - anticorrosive agent-pH adjusting agent complex
11 - - - anticorrosive agent (titanium dioxide particle)
12 - - - pH adjusting agent
12A - - - alkaline type pH adjusting agent
12B - - - acidic type pH adjusting agent
25 - - - oxydant
35 - - - reductant
42 - - - oxidation product of pH adjusting agent
45 - - - reduction product of oxidant
52 - - - reduction product of pH adjusting agent
55 - - - oxidation product of reductant
60 - - - high temperature water
65 - - - metal structural material
70 - - - radiation field
75 - - - radioactive ray
80 - - - ultraviolet ray irradiation environment
85 - - - ultraviolet ray

The invention claimed is:

1. A method for injecting a corrosion inhibitor, comprising:
injecting an oxidant and a pre-formed anticorrosive agent-pH adjusting agent complex comprising an anticorrosive agent and a pH adjusting agent adsorbed on a surface of the anticorrosive agent into high temperature water that is in contact with a surface of a metal structural material and is under irradiation by a radioactive ray or an ultraviolet ray;
wherein the anticorrosive agent of the anticorrosive agent-pH adjusting agent complex has, on a surface of the anticorrosive agent, an active site where the pH adjusting agent reacts with the oxidant,
the pH adjusting agent present on the surface of the anticorrosive agent, in the high temperature water, or both, is oxidized with the oxidant by the irradiation with the radioactive ray or the ultraviolet ray to change a pH adjusting ability of the pH adjusting agent and shift a pH of the high temperature water to a neutral side, and thereby accelerate deposition of the anticorrosive agent to the metal structural material, and
the temperature of the high temperature water is 100 to 350° C.

2. The method according to claim 1,
wherein the pH adjusting agent is an alkaline type pH adjusting agent making the pH of the high temperature water more than 9 by adding the pH adjusting agent to the high temperature water, and
the pH adjusting agent is oxidized with the oxidant by the irradiation with the radioactive ray or the ultraviolet ray to shift the pH of the high temperature water to the neutral side.

3. The method according to claim 1, wherein the pH of the high temperature water after the pH of the high temperature water is shifted to the neutral side is within a range of 4 to 10.

4. The method according to claim 1, wherein the high temperature water is irradiated with a radioactive ray that is an α-ray, a γ-ray, or a neutron ray.

5. The method according to claim 1, wherein the pH adjusting agent is an inorganic compound or an organic compound comprising at least one element selected from the group consisting of nitrogen, sulfur, and carbon.

6. The method according to claim 1, wherein the anticorrosive agent is a semiconductor.

7. The method according to claim 1, wherein the anticorrosive agent is titanium oxide $TiO_2$.

8. The method according to claim 1, wherein the oxidant is at least one selected from the group consisting of hydrogen peroxide, oxygen, ozone, a superoxide radical, and a hydroxy radical.

9. The method according to claim 1, wherein the high temperature water has a temperature of from 120 to 180° C.

10. The method according to claim 1, wherein the metal structural material is stainless steel, a nickel based alloy, or carbon steel.

11. A method for injecting a corrosion inhibitor, comprising:
injecting a pre-formed anticorrosive agent-pH adjusting agent complex comprising an anticorrosive agent and a pH adjusting agent adsorbed on a surface of the anticorrosive agent into high temperature water that is in contact with a surface of a metal structural material and is under irradiation by a radioactive ray or an ultraviolet ray;
wherein the anticorrosive agent generates an oxidant from the high temperature water by the irradiation with the radioactive ray or the ultraviolet ray,
the pH adjusting agent present on the surface of the anticorrosive agent, in the high temperature water, or both, is oxidized with the oxidant to change a pH adjusting ability of the pH adjusting agent and shift a pH of the high temperature water to a neutral side, and thereby accelerate deposition of the anticorrosive agent to the metal structural material, and
the temperature of the high temperature water is 100 to 350° C.

12. The method according to claim 11, wherein the metal structural material is stainless steel, a nickel based alloy, or carbon steel.

13. A method for injecting a corrosion inhibitor, comprising:
injecting a reductant and a pre-formed anticorrosive agent-pH adjusting agent complex comprising an anticorrosive agent and a pH adjusting agent adsorbed on a surface of the anticorrosive agent into high temperature water that is in contact with a surface of a metal structural material and is under irradiation by a radioactive ray or an ultraviolet ray;
wherein the anticorrosive agent of the anticorrosive agent-pH adjusting agent complex has, on a surface of the anticorrosive agent, an active site where the pH adjusting agent reacts with the reductant,
the pH adjusting agent present on the surface of the anticorrosive agent, in the high temperature water, or both, is reduced with the reductant by the irradiation with the radioactive ray or the ultraviolet ray to change a pH adjusting ability of the pH adjusting agent and shift a pH of the high temperature water to a neutral side, and thereby accelerate deposition of the anticorrosive agent to the metal structural material, and the temperature of the high temperature water is 100 to 350° C.

14. The method according to claim 13, wherein the pH adjusting agent is an acidic type pH adjusting agent making the pH of the high temperature water less than 5 by adding the pH adjusting agent to the high temperature water, and the pH adjusting agent is reduced with the reductant by the irradiation with the radioactive ray or the ultraviolet ray to shift the pH of the high temperature water to the neutral side.

15. The method according to claim 13, wherein the anticorrosive agent is at least one oxide selected from the group consisting of iron oxide $Fe_3O_4$, chromium oxide $Cr_2O_3$, and nickel oxide NiO.

16. The method according to claim 13, wherein the metal structural material is stainless steel, a nickel based alloy, or carbon steel.

17. A method for injecting a corrosion inhibitor, comprising:

injecting a pre-formed anticorrosive agent-pH adjusting agent complex comprising an anticorrosive agent and a pH adjusting agent adsorbed on a surface of the anticorrosive agent into high temperature water that is in contact with a surface of a metal structural material and is under irradiation by a radioactive ray or an ultraviolet ray; and wherein the anticorrosive agent generates a reductant from the high temperature water by the irradiation with the radioactive ray or the ultraviolet ray, the pH adjusting agent present on a surface of the anticorrosive agent, in the high temperature water, or both, is reduced with the reductant to change a pH adjusting ability of the pH adjusting agent and shift a pH of the high temperature water to a neutral side, and thereby accelerate deposition of the anticorrosive agent to the metal structural material, and the temperature of the high temperature water is 100 to 350° C.

18. The method according to claim 17, wherein the metal structural material is stainless steel, a nickel based alloy, or carbon steel.

* * * * *